(12) United States Patent
Yamanaka

(10) Patent No.: US 10,611,413 B2
(45) Date of Patent: Apr. 7, 2020

(54) CONSTRUCTION MACHINE

(71) Applicant: Hitachi Construction Machinery Co., Ltd., Taito-ku, Tokyo (JP)

(72) Inventor: Shinya Yamanaka, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/081,727

(22) PCT Filed: Aug. 2, 2017

(86) PCT No.: PCT/JP2017/028101
§ 371 (c)(1),
(2) Date: Aug. 31, 2018

(87) PCT Pub. No.: WO2018/061475
PCT Pub. Date: Apr. 5, 2018

(65) Prior Publication Data
US 2019/0023328 A1    Jan. 24, 2019

(30) Foreign Application Priority Data
Sep. 29, 2016 (JP) .................. 2016-191359

(51) Int. Cl.
*B62D 27/04* (2006.01)
*B62D 33/06* (2006.01)
(Continued)

(52) U.S. Cl.
CPC ......... *B62D 27/04* (2013.01); *B62D 33/0604* (2013.01); *B62D 33/0617* (2013.01);
(Continued)

(58) Field of Classification Search
CPC .... B62D 27/04; B62D 24/02; B62D 33/0604; B62D 33/0617; B62D 33/0608;
(Continued)

(56) References Cited

U.S. PATENT DOCUMENTS 5,219,439 A * 6/1993 Moore ................... B62D 24/02
296/204
5,516,176 A * 5/1996 Kimoto .................. B62D 27/04
248/562

(Continued)

FOREIGN PATENT DOCUMENTS

JP             50-6090  Y1    2/1975
JP        2000-170210  A     6/2000
(Continued)

OTHER PUBLICATIONS

International Search Report (PCT/ISA/210) issued in PCT Application No. PCT/JP2017/028101 dated Sep. 26, 2017 with English translation (five (5) pages).
(Continued)

*Primary Examiner* — Gregory A Blankenship
(74) *Attorney, Agent, or Firm* — Crowell & Moring LLP

(57) ABSTRACT

A hydraulic excavator includes a revolving frame forming a support structure, a cab that is disposed to be positioned on a front side of the revolving frame and in which an operator gets, and a plurality of vibration isolating members that are disposed between the revolving frame and the cab to support the cab on the revolving frame in a vibration isolating state. Further, an intermediate connecting member is disposed for connection between the revolving frame and the vibration isolating member and for a height position adjustment of the cab to the revolving frame. The intermediate connecting member is fixed to the revolving frame from a lower side.

6 Claims, 16 Drawing Sheets

(51) Int. Cl.
  *B62D 24/02* (2006.01)
  *E02F 9/16* (2006.01)
  *F16F 13/10* (2006.01)
  *B66C 13/54* (2006.01)
  *E02F 9/00* (2006.01)
  *B62D 53/10* (2006.01)
  *E02F 9/08* (2006.01)

(52) U.S. Cl.
  CPC .............. *B62D 53/10* (2013.01); *B66C 13/54* (2013.01); *E02F 9/00* (2013.01); *E02F 9/0808* (2013.01); *E02F 9/16* (2013.01); *F16F 13/10* (2013.01); *B62D 33/0608* (2013.01)

(58) Field of Classification Search
  CPC . F16F 1/3732; F16F 13/10; E02F 9/16; E02F 9/166
  USPC ........................ 296/190.07; 180/89.12, 89.13
  See application file for complete search history.

(56) References Cited

U.S. PATENT DOCUMENTS

| | | | | |
|---|---|---|---|---|
| 5,799,930 | A * | 9/1998 | Willett | B62D 24/02 267/141.4 |
| 5,984,036 | A * | 11/1999 | Higuchi | E02F 9/166 180/89.12 |
| 9,038,997 | B2 * | 5/2015 | Bradshaw | F16F 13/16 267/292 |
| 2006/0202515 | A1 * | 9/2006 | Dickson | B60G 99/002 296/190.07 |
| 2011/0135434 | A1 * | 6/2011 | Yoon | B62D 33/0604 414/694 |
| 2015/0298745 | A1 * | 10/2015 | McMullen | F16F 1/3735 248/635 |
| 2017/0241499 | A1 * | 8/2017 | Kosov | B62D 33/0604 |
| 2019/0023328 | A1 * | 1/2019 | Yamanaka | E02F 9/00 |
| 2019/0039654 | A1 * | 2/2019 | Rawlings | B62D 23/005 |
| 2019/0136930 | A1 * | 5/2019 | Caron-L'Ecuyer | B64C 1/066 |
| 2019/0185063 | A1 * | 6/2019 | Sasaki | B62D 21/186 |
| 2019/0300076 | A1 * | 10/2019 | Tilp | B62D 33/077 |

FOREIGN PATENT DOCUMENTS

| | | |
|---|---|---|
| JP | 3075835 U | 3/2001 |
| JP | 2001-130443 A | 5/2001 |
| JP | 2001-323510 A | 11/2001 |
| JP | 2005-344394 A | 12/2005 |
| JP | 2008-111544 A | 5/2008 |
| JP | 2008-260402 A | 10/2008 |

OTHER PUBLICATIONS

Japanese-language Written Opinion (PCT/ISA/237) issued in PCT Application No. PCT/JP2017/028101 dated Sep. 26, 2017 (four (4) pages).
Extended European Search Report issued in counterpart European Application No. 17855433.3 dated Sep. 4, 2019 (10 pages).

* cited by examiner

CONSTRUCTION MACHINE

TECHNICAL FIELD

The present invention relates to construction machines of hydraulic excavators or the like, and particularly, to a construction machine in which a cab is mounted on a vehicle body frame through a vibration isolating member.

BACKGROUND ART

In general, a hydraulic excavator as a representative example of construction machines is provided with an automotive lower traveling structure, an upper revolving structure that is mounted on the lower traveling structure to be capable of revolving thereon and a working mechanism that is mounted on the upper revolving structure to be capable of tilting and lifting thereto.

A revolving frame as a base of the upper revolving structure is provided with a center frame that is positioned in an intermediate part in a left-right direction to extend in a front-rear direction, a plurality of extension beams that are arranged to extend in the left-right direction to be spaced in the front-rear direction from the center frame, left and right side frames that are arranged in the left-right direction across the center frame and are jointed to the respective extension beams to extend in the front-rear direction and a front side cab support frame that is disposed between a front end side of the left side frame and the center frame. On the other hand, the front side cab support frame of the revolving frame is regularly provided with two vibration isolating members (vibration isolating mounts), and the extension beam positioned in back of the front side cab support frame is regularly provided with two vibration isolating members (vibration isolating mounts).

A cab in which an operator gets is supported in a vibration isolating manner on a left front side of the revolving frame by the four vibration isolating members (Patent Document 1). At the traveling of the hydraulic excavator, each of the vibration isolating members alleviates vibrations to be transmitted to the cab through the revolving frame at working. In this way, the vibration isolating members are disposed, making it possible to improve ride comfort of an operator that controls the hydraulic excavator in the inside of the cab.

Here, the cab is arranged on an upper side of the revolving frame. Therefore, in some cases the cab is inclined or a gap between a lower end edge of the cab and the revolving frame is not made constant, depending upon a finish state at the time of manufacturing the revolving frame. Therefore, the hydraulic excavator adds spacers between the revolving frame and the vibration isolating members to perform a height adjustment of the cab.

PRIOR ART DOCUMENT

Patent Document

Patent Document 1: Japanese Patent Laid-Open No. 2001-130443 A

SUMMARY OF THE INVENTION

In a case of performing the height adjustment of the cab, however, even when bolts fixing the vibration isolating member are loosened, a gap for insert of the spacer between the revolving frame and the vibration isolating member is not formed. Therefore, at the height adjustment work of the cab, the cab is required to be hoisted using a crane or the like to form the gap. As a result, there is posed a problem of taking many labors and hours for the height adjustment work of the cab.

The present invention is made in view of the aforementioned problems in the conventional art, and an object of the present invention is to provide a construction machine that can easily perform a height adjustment work of a cab without performing a hoisting work of the cab.

The present invention provides a construction machine comprising, a vehicle body frame forming a support structure, a cab that is disposed to be positioned on a front side of the vehicle body frame and in which an operator gets, and a plurality of vibration isolating members that are disposed between the vehicle body frame and the cab to support the cab on the vehicle body frame in a vibration isolating state, wherein an intermediate connecting member is disposed between the vehicle body frame and each of the vibration isolating members for connection between the vehicle body frame and each of the vibration isolating members and for a height position adjustment of the cab to the vehicle body frame, the intermediate connecting member being fixed to the vehicle body frame from a lower side.

According to the present invention, it is possible to easily perform the height adjustment work of the cab without performing the hoisting work of the cab.

BRIEF DESCRIPTION OF THE DRAWINGS

FIG. 3 is an exploded perspective view showing a left front side section of the revolving frame, the cab (floor plate), vibration isolating members, intermediate connecting members and the like.

FIG. 11 is an exploded perspective view showing connecting tools of intermediate connecting members and downside spacers according to a second embodiment together with the left front side section of the revolving frame, the cab (floor plate), the vibration isolating members and the like.

FIG. 20 is an exploded perspective view showing the arrangement of intermediate connecting members according to a modification together with the left front side section of the revolving frame, the cab (floor plate), the vibration isolating members and the like.

MODE FOR CARRYING OUT THE INVENTION

Figure 1:
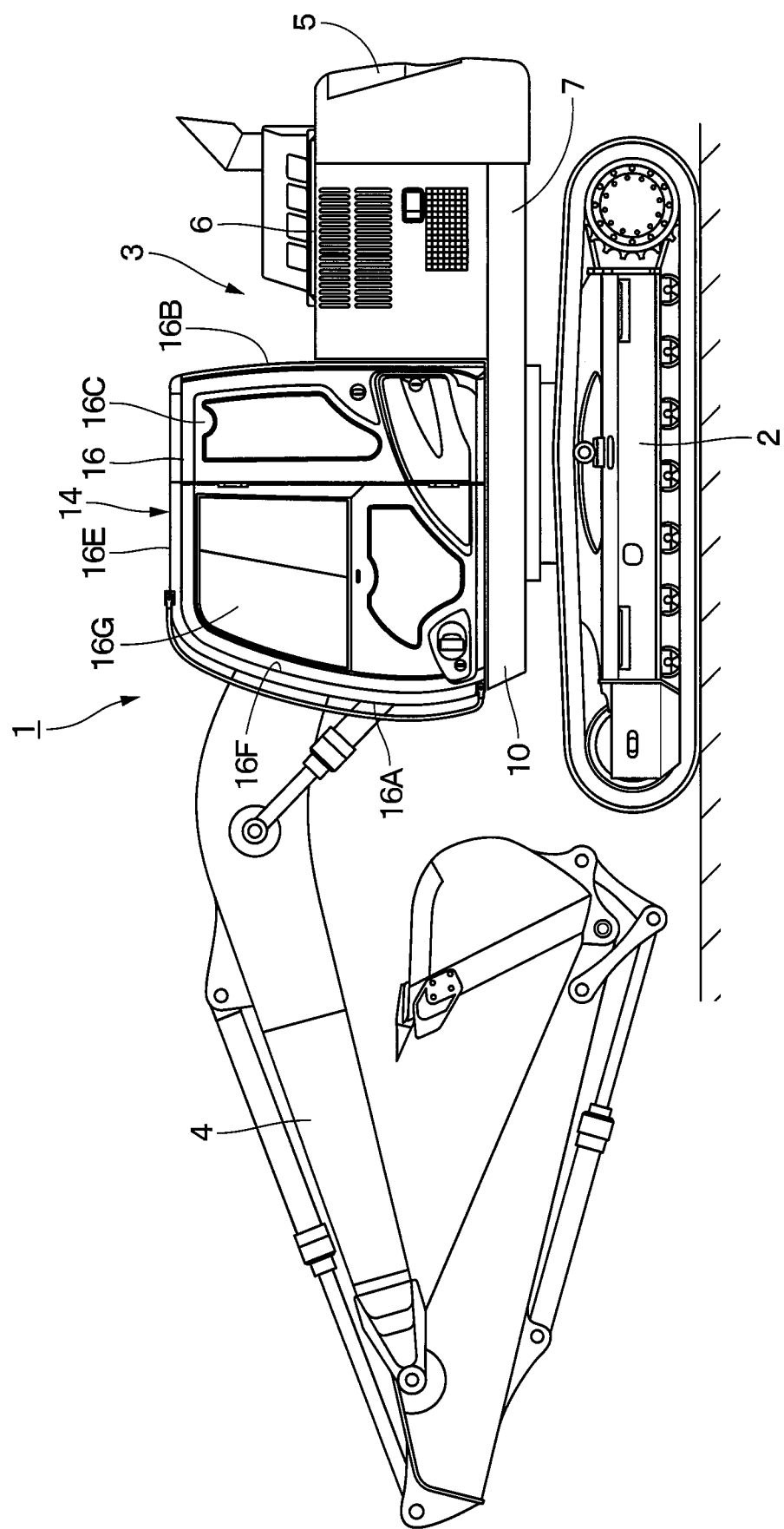
FIG. 1 is a left side view showing a hydraulic excavator according to a first embodiment in the present invention.

Hereinafter, an explanation will be in detail made of construction machines according to embodiments in the present invention with reference to the accompanying drawings, by taking a hydraulic excavator of a crawler type as a representative example of the construction machines.

FIG. 1 to FIG. 10 show a first embodiment of the present invention. Here, a hydraulic excavator is configured to arrange vibration isolating members in four locations composed of a left front position, a right front position, a left rear position and a right rear position of a cab and support the cab on a revolving frame in a vibration isolating state by each of the vibration isolating members. In this case, the cab is possibly inclined to the revolving frame. For example, the cab is inclined due to being lower in a front side, in a rear side, in a left side and in a right side as compared to other sections, and due to being lower in a left front side (diagonally) to a right rear side and in right front side (diagonally) to a left rear side. Therefore, in the first embodiment, a case where the front side of the cab is lower relative to the rear side of the cab and the cab is adjusted to a horizontal state by heightening the lowered front side will be explained as an example.

In addition, FIG. 4, FIG. 5, FIG. 8 to FIG. 10 used in the first embodiment schematically show, for easy understanding of amounting relation of a revolving frame 7, vibration isolating members 18 and intermediate connecting members 20, frame bolts 22 and vibration isolating bolts 24 to be described later, which are assumed to exist on the same cross section.

In FIG. 1, a hydraulic excavator 1 as a representative example of construction machines is provided with a vehicle body formed of an automotive lower traveling structure 2 of a crawler type and an upper revolving structure 3 that is mounted on the lower traveling structure 2 to be capable of revolving thereon. A front device 4 is disposed on a front side of the upper revolving structure 3 to be capable of tilting and lifting thereto, and an excavating work of earth and sand is performed by the front device 4.

The upper revolving structure 3 includes the revolving frame 7 to be described later, a counterweight 5 disposed in a rear part of the revolving frame 7 to act as a weight balance to the front device 4, mounting equipment devices (not shown) including an engine and a heat exchanger positioned in front of the counterweight 5 to be mounted on the revolving frame 7, an exterior cover 6 that covers the mounting equipment devices, a cab 14 to be described later and the respective intermediate connecting members 20.

Figure 2:
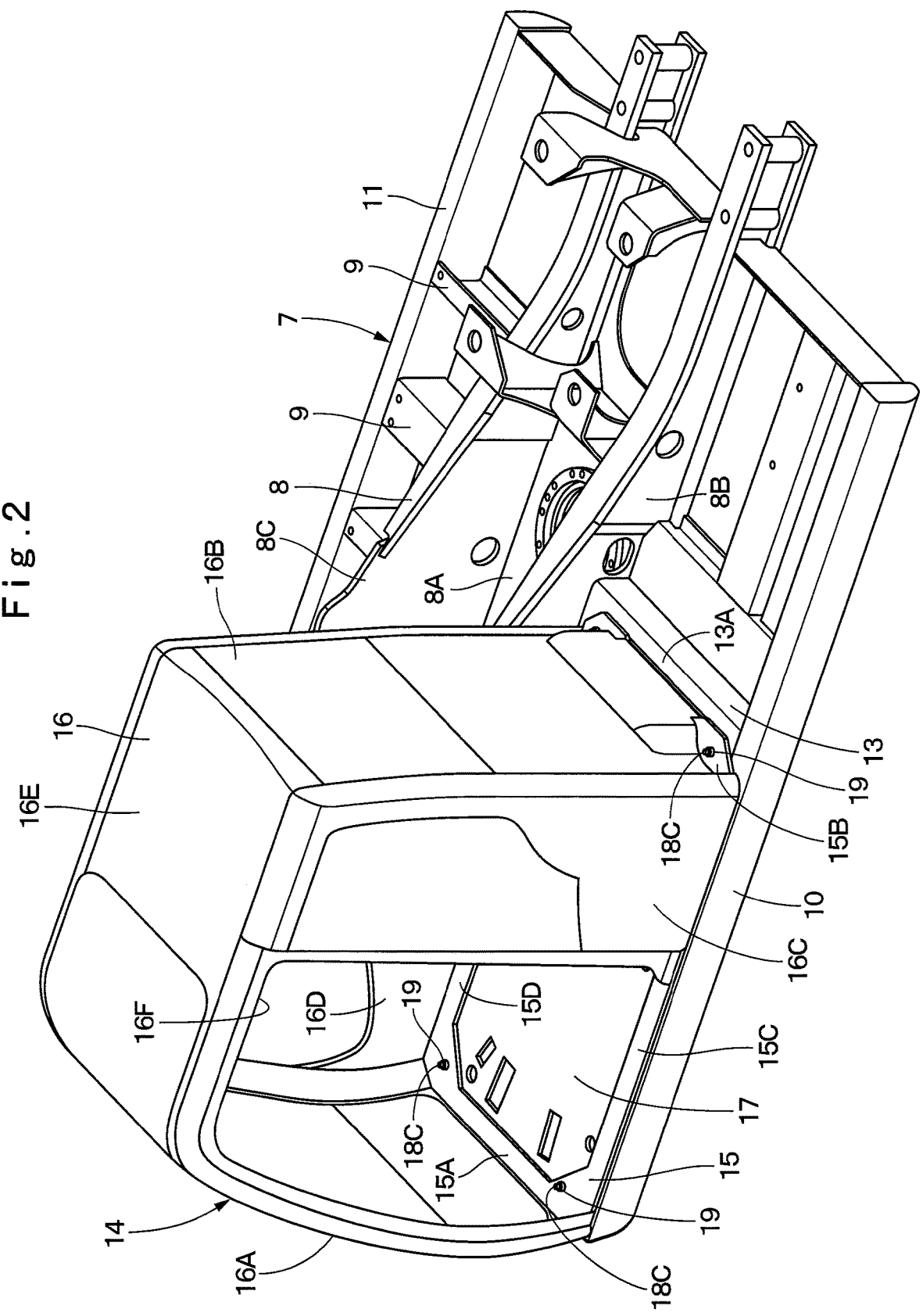
FIG. 2 is a perspective view showing a state where a cab is mounted on a revolving frame.
Figure 3:
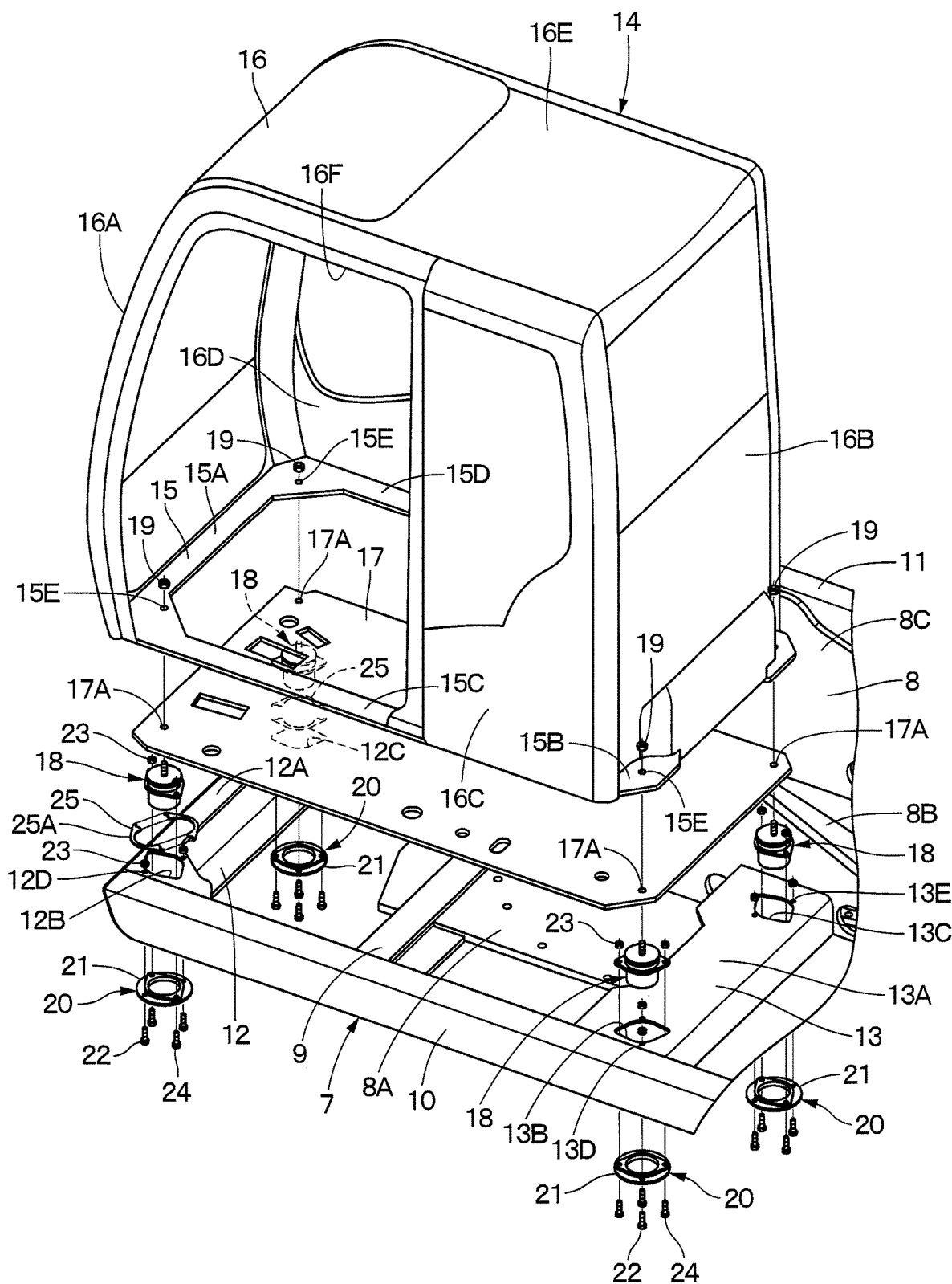

The revolving frame 7 is configured as a vehicle body frame to be a rigid support structure. As shown in FIG. 2 and FIG. 3, the revolving frame 7 is provided with a center frame 8 that is positioned in an intermediate part in a left-right direction and extends in a front-rear direction, a plurality of extension beams 9 that extend in the left-right direction from the center frame 8, and a left side frame 10 and a right side frame 11 that are arranged in the left and right sides across the center frame 8.

The center frame 8 forms a center part of the revolving frame 7. The center frame 8 is formed of a flat, thick bottom plate 8A that extends in the front-rear direction, and a left vertical plate 8B and a right vertical plate 8C that are disposed upward on the bottom plate 8A to be spaced in the left-right direction and extend in the front-rear direction. A foot part of the front device 4 is mounted in a front side of the left vertical plate 8B and the right vertical plate 8C to be rotatable thereto.

A plurality of the extension beams 9 extend toward an outer side in the left-right direction from the center frame 8. The respective extension beams 9 are arranged to be spaced in the front-rear direction in a state where a base end side thereof is connected to the center frame 8 and a tip end side thereof extends in the left-right direction from the center frame 8. The left side frame 10 extending in the front-rear direction is jointed to a tip end (left end) of each of the extension beams 9 extending to the left side from the center frame 8. The right side frame 11 extending in the front-rear direction is jointed to a tip end (right end) of each of the extension beams 9 extending to the right side from the center frame 8.

A front side cab support frame 12 extends in the left-right direction to support a front side section of the cab 14, which will be described later. The front side cab support frame 12 is arranged at the forefront in the left side of the revolving frame 7 and extends to the right side from a front end part of the left side frame 10. The front side cab support frame 12 has a flat plate part 12A that faces a floor plate 17 of the cab 14 and extends in the left-right direction. The flat plate part 12A is formed of a flat plate having a plate thickness dimension ΔH1 (see FIG. 4) having strength of supporting the front side of the cab 14.

As shown in FIG. 3, a left vibration isolating member mounting hole 12B is formed in the flat plate part 12A in a left side position (position in the vicinity of the left side frame 10) in the left-right direction. On the other hand, a right vibration isolating member mounting hole 12C is formed in a right side position (position in the vicinity of the center frame 8) in the flat plate part 12A to be symmetric bilaterally to the left vibration isolating member mounting hole 12B in the left-right direction.

Figure 4:
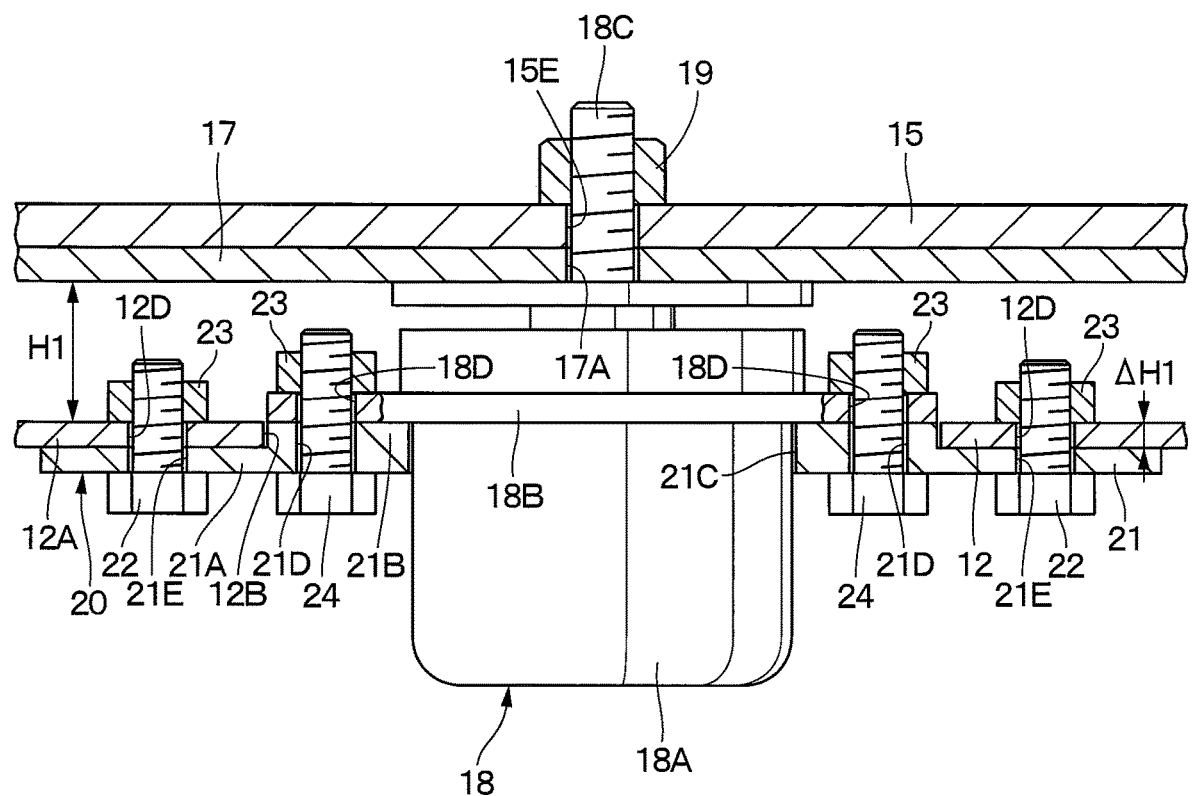
FIG. 4 is a cross section schematically showing a standard support structure supporting the cab on a flat plate part of a front side cab support frame through a connecting tool of the intermediate connecting member and the vibration isolating member.
Figure 5:
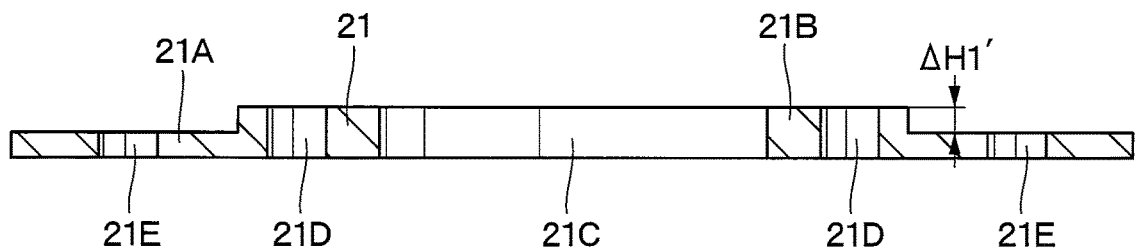
FIG. 5 is a cross section showing the connecting tool of the intermediate connecting member in FIG. 4 as a single body.
Figure 7:
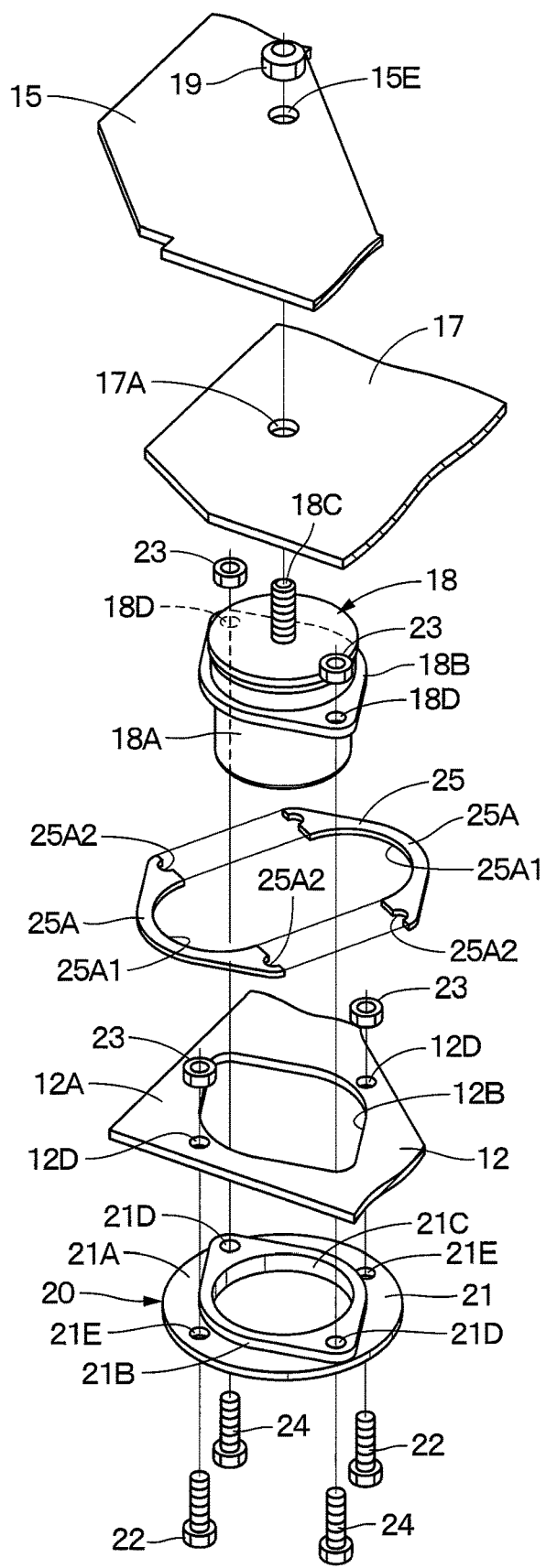
FIG. 7 is an exploded perspective view showing the flat plate of the front side cab support frame, the cab (the base frame and the floor plate), the vibration isolating member, the connecting tool of the intermediate connecting member and an upside spacer of the intermediate connecting member in an exploded manner.

Here, as shown in FIG. 4, the vibration isolating member 18 is arranged in the left vibration isolating member mounting hole 12B in a state of being inserted in the upper-lower direction. As shown in FIG. 7, the left vibration isolating member mounting hole 12B is formed as a diamond shaped opening larger than a flange part 18B to be described later such that the vibration isolating member 18 can transmit (move) in an upper-lower direction. In addition, the right vibration isolating member mounting hole 12C is formed as a diamond shaped opening such that the vibration isolating member 18 can transmit (move) in the upper-lower direction as substantially similar to the left vibration isolating member mounting hole 12B.

Further, two bolt through holes 12D are positioned in the vicinity of the diamond shaped left vibration isolating member mounting hole 12B on an extension line of a short diagonal line thereof to be formed to penetrate through the flat plate part 12A in the upper-lower direction. Each of the bolt through holes 12D corresponds to a bolt through hole 21E of a connecting tool 21 forming the intermediate connecting member 20 to be described later. Likewise, two bolt through holes (not shown) are positioned in the vicinity of the right vibration isolating member mounting hole 12C on an extension line of a short diagonal line thereof to be formed to penetrate in the upper-lower direction in a position corresponding to the bolt through holes 21E of the connecting tool 21.

As shown in FIG. 3, among the plurality of the extension beams 9 forming the revolving frame 7, one extension beam 9 that is in back of the front side cab support frame 12 and corresponds to a rear part of the cab 14 becomes a cab support extension beam 13 for supporting a rear side section of the cab 14. The cab support extension beam 13 has a left vibration isolating member mounting hole 13B, a right vibration isolating member mounting hole 13C and respective bolt through holes 13D, 13E on a flat plate part 13A to be symmetric to the front side cab support frame 12 in the front-rear direction. A plate thickness dimension of the flat plate part 13A is set to a dimension, for example, as similar to the plate thickness dimension ΔH1 of the flat plate part 12A of the front side cab support frame 12. On the other hand, the plate thickness dimension of the flat plate part 13A can be made different from the plate thickness dimension ΔH1 of the flat plate part 12A of the front side cab support frame 12 in response to a weight distribution of the cab 14.

The cab 14 defines an operator's room inside. The cab 14 is disposed in positions corresponding to the front side cab support frame 12 and the cab support extension beam 13 of the revolving frame 7. The cab 14 is elastically supported on the front side cab support frame 12 and the cab support extension beam 13 through the four vibration isolating members 18. Here, the cab 14 is configured to include a base frame 15, a cab box 16 and the floor plate 17.

The base frame 15 forms a lower side of the cab 14. The base frame 15 is formed as a frame structure in a rectangular shape long in the front-rear direction by a front connecting frame 15A, a rear connecting frame 15B, a left connecting frame 15C and a right connecting frame 15D. Apart of the rear connecting frame 15B projects outside from a rear side of the cab box 16. A total of four bolt through holes 15E are disposed to penetrate the base frame 15 in the upper-lower direction to be positioned in four corners of a left front, a right front, a left rear and a right rear. A mounting screw part 18C of the vibration isolating member 18 to be described later is inserted in each of the bolt through holes 15E.

The cab box 16 forms an outer shell of the cab 14. The cab box 16 is formed by a front surface part 16A, a rear surface part 16B, a left side surface part 16C, a right side surface part 16D and a top surface part 16E, and the cab box 16 is formed as a box shaped body having strength. The left side surface part 16C is provided with an entrance way 16F. The entrance way 16F is provided with a door 16G (see FIG. 1) to be capable of opening/closing. A lower end part of the cab box 16 is fixed on the base frame 15 using means of welding or the like.

The floor plate 17 forms a bottom plate of the cab 14 together with the base frame 15. The floor plate 17 is disposed in a lower side of the base frame 15 to close a lower side of the cab box 16. The floor plate 17 is formed as a rectangular plate body elongated in the front-rear direction to correspond to an outer shape of the base frame 15. The floor plate 17 has a periphery that is mounted on the base frame 15 using bolts (not shown). Four bolt through holes 17A are disposed in corner parts of the floor plate 17 to correspond to the bolt through holes 15E of the base frame 15.

Next, an explanation will be made of the four vibration isolating members 18 that are disposed between the revolving frame 7 and the cab 14.

The vibration isolating members 18 elastically support the cab 14 to the revolving frame 7. A total of the four vibration isolating members 18 are disposed between the front side cab support frame 12 of the revolving frame 7 and the cab 14 and between the cab support extension beam 13 and the cab 14. The vibration isolating members 18 support the cab 14 to suppress vibrations that will be transmitted from the revolving frame 7 to the cab 14. Specifically, the vibration isolating members 18 are disposed between a left side position (left vibration isolating member mounting hole 12B) of the front side cab support frame 12, and the base frame 15 and a left front position (positions of the bolt through holes 15E, 17A) of the floor plate 17, between a right front position (right vibration isolating member mounting hole 12C) of the front side cab support frame 12, and the base frame 15 and a right front position of the floor plate 17, between a left side position (left vibration isolating member mounting hole 13B) of the cab support extension beam 13, and the base frame 15 and a left rear position of the floor plate 17, and between a right side position (right vibration isolating member mounting hole 13C) of the cab support extension beam 13, and the base frame 15 and a right rear position of the floor plate 17 one by one.

Here, each of the vibration isolating members 18 includes, for example, a main body part 18A in which a viscosity liquid is encapsulated to have a damping function of vibrations, a flange part 18B that is disposed on an outer periphery closer to an upper side of the main body part 18A, and the mounting screw parts 18C as fastening parts extending to project upward from an upper part center of the main body part 18A.

The main body part 18A is formed as a sealed vessel having a columnar outer surface. The flange part 18B is formed in a diamond shape as a whole. In this case, the flange part 18B is formed in a diamond shape as a whole in such a manner that two triangular plate bodies are arranged to face to each other and are fixed on an outer periphery of the main body part 18A. The diamond shaped flange part 18B is formed to be smaller in size (shape) than each of the vibration isolating member mounting holes 12B, 12C, 13B, 13C in such a manner of being capable of being inserted in each of the vibration isolating member mounting holes 12B, 12C of the front side cab support frame 12 and each of the vibration isolating member mounting holes 13B, 13C of the rear side cab support extension beam 13. Further, a triangular projecting section of the flange part 18B is provided with bolt through holes 18D to penetrate in the upper-lower direction.

Here, each of the bolt through holes 18D of the vibration isolating members 18 is structured such that a radial position (diameter dimension of a pitch circle) thereof is the same as or a value close to a radial position of each of the bolt through holes 12D of the front side cab support frame 12 and each of the bolt through holes 13D, 13E of the rear side cab support extension beam 13. Thereby, it is possible to suppress a space required for supporting the vibration isolating member 18 by the intermediate connecting member 20 to be described later to be small. Further, the mounting screw part 18C is connected to the main body part 18A through an annular rubber member (not shown) to be displaceable in the upper-lower direction.

As shown in FIG. 3 and FIG. 4, the flange part 18B of the vibration isolating member 18 positioned in each of the left front side and the right front side of the cab 14 is mounted on the flat plate part 12A of the front side cab support frame 12 through the intermediate connecting member 20. The mounting screw part 18C is inserted in the bolt through holes 15E, 17A positioned in a left front side of the base frame 15 and the floor plate 17 and is mounted on the base frame 15 and the floor plate 17 by a nut 19.

In addition, the flange part 18B of the vibration isolating member 18 positioned in each of the left rear side and the right rear side of the cab 14 is mounted on the flat plate part 13A of the cab support extension beam 13 through the intermediate connecting member 20. The mounting screw part 18C is inserted in the bolt through holes 15E, 17A positioned in a left rear side of the base frame 15 and the floor plate 17 and is mounted on the base frame 15 and the floor plate 17 by the nut 19.

Next, an explanation will be made of the configuration, the assembly structure and the height adjustment work of the intermediate connecting member 20 provided with an upside spacer 25 that is a characterized portion of the present invention.

Figure 6:
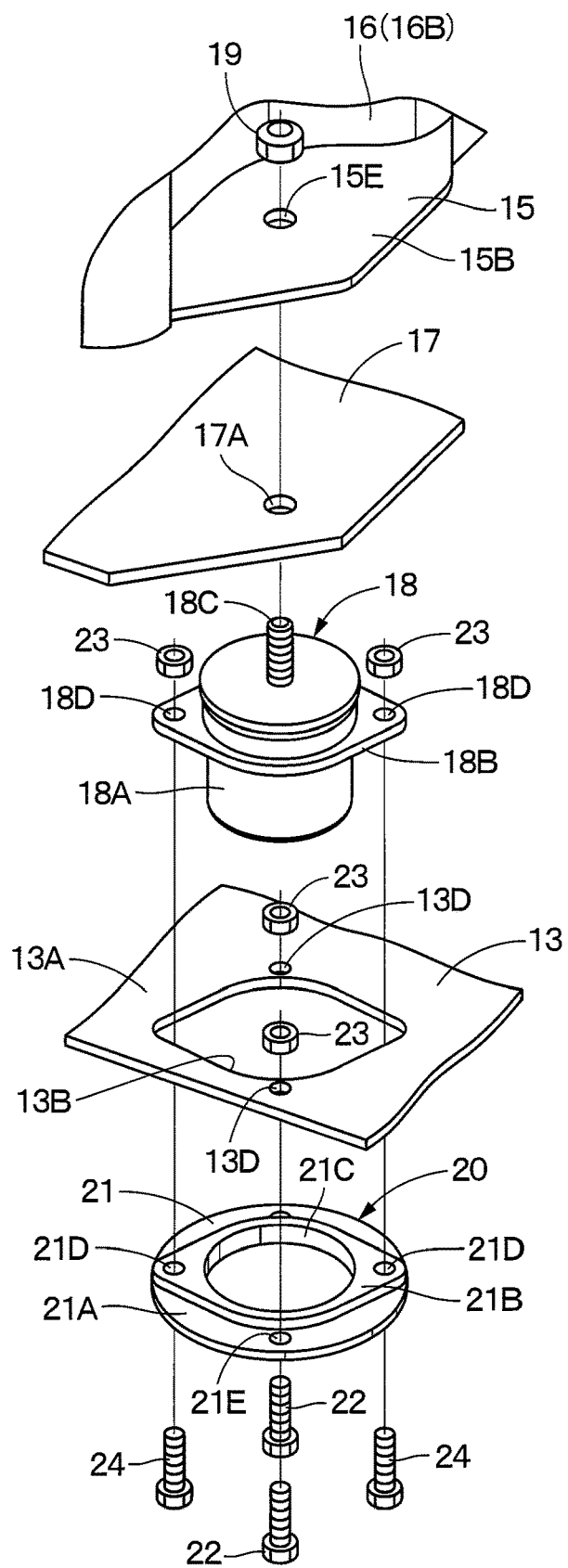
FIG. 6 is an exploded perspective view showing a flat plate part of a cab support extension beam, the cab (a base frame and the floor plate), the vibration isolating member and the connecting tool of the intermediate connecting member in an exploded manner.

As shown in FIG. 6 and FIG. 7, the intermediate connecting member 20 is disposed between the revolving frame 7 and each of the vibration isolating members 18. Each of the intermediate connecting members 20 is used for connection between the revolving frame 7 and the vibration isolating member 18 and for adjustment of a height position of the cab 14 to the revolving frame 7 as needed. The intermediate connecting member 20 uses the connecting tool 21 formed in a disc shape as abase and overlaps the upside spacer 25 between the connecting tool 21 and the flange part 18B of the vibration isolating member 18 in the upper-lower direction, thus making it possible to heighten the height position of the cab 14.

The connecting tool 21 forming the intermediate connecting member 20 is provided with a disc part 21A composed of an annular plate body and a flange mounting part 21B formed to project in a diamond shape in an inner diameter side of the disc part 21A. An inner diameter side of the flange mounting part 21B becomes a circular opening 21C for insert of the main body part 18A of the vibration isolating member 18. Two bolt through holes 21D are disposed in the connecting tool 21 to be positioned on an outer peripheral side on a long diagonal line in the diamond shaped flange mounting part 21B. Each of the bolt through holes 21D corresponds to each of the bolt through holes 18D of the vibration isolating member 18 and is disposed to penetrate the flange mounting part 21B in the upper-lower direction. Further, two bolt through holes 21E are disposed to penetrate the disc part 21A in the upper-lower direction in positions rotated by 90 degrees from each of the bolt through holes 21D. Each of the bolt through holes 21E corresponds to each of the bolt through holes 12D of the front side cab support frame 12 and each of the bolt through holes 13D, 13E of the cab support extension beam 13.

Here, a height dimension $\Delta H1'$ of the flange mounting part 21B is set to the same dimension as the plate thickness dimension $\Delta H1$ of the flat plate part 12A of the front side cab support frame 12 as indicated at the following Formula 1. Thereby, an upper surface of the flange mounting part 21B is continuous to an upper surface of the flat plate part 12A of the front side cab support frame 12 without a shoulder therebetween.

$$\Delta H1 = \Delta H1' \quad \text{[Formula 1]}$$

The connecting tool 21 of the intermediate connecting member 20 is fixed on a lower surface of the revolving frame 7 from a lower side. That is, the connecting tool 21 fits the flange mounting part 21B to the left vibration isolating member mounting hole 12B disposed in the flat plate part 12A of the front side cab support frame 12 from a lower side. In this state, the frame bolts 22 are inserted in each of the bolt through holes 21E of the connecting tool 21 and each of the bolt through holes 12D of the flat plate part 12A and a nut 23 is screwed in a tip end of the frame bolt 22. Thereby, the connecting tool 21 can be mounted on a left side section of a lower surface of the flat plate part 12A of the front side cab support frame 12 from the lower side.

When the connecting tool 21 is mounted on the left side section of the front side cab support frame 12, the main body part 18A of the vibration isolating member 18 is inserted in the opening 21C of the connecting tool 21 from an upper side and the flange part 18B of the vibration isolating member 18 is placed on an upper surface of the flange mounting part 21B of the connecting tool 21 in a positioning state. In this state, the vibration isolating bolts 24 are inserted in each of the bolt through holes 21D of the connecting tool 21 and each of the bolt through holes 18D of the vibration isolating member 18 from a lower side and the nut 23 is screwed in a tip end of the vibration isolating bolt 24. Thereby, the vibration isolating member 18 can be mounted on a left side section of the front side cab support frame 12 through the connecting tool 21. It should be noted that a mounting structure of the vibration isolating member 18 to each of the right side section of the front side cab support frame 12, the left side section and the right side section of the cab support extension beam 13 is similar to the mounting structure of the vibration isolating member 18 to the left side section of the front side cab support frame 12, and is therefore omitted.

Figure 10:
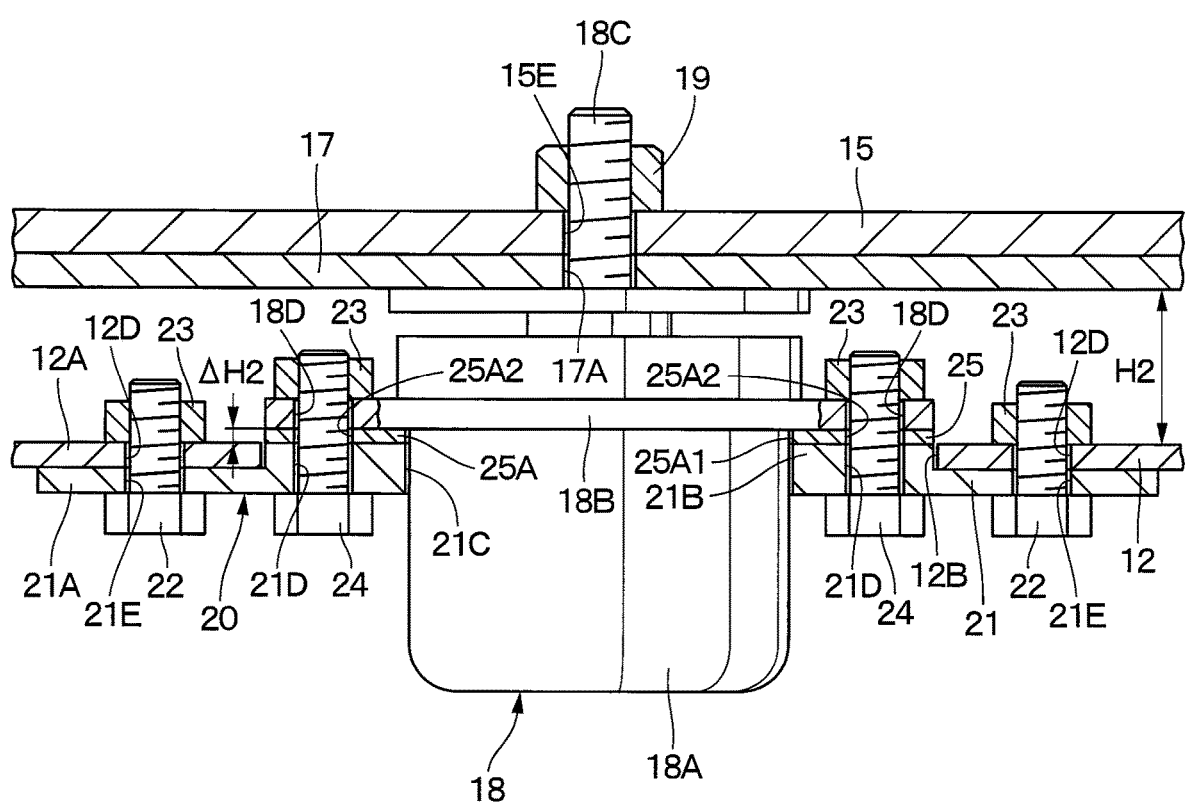
FIG. 10 is a cross section showing a state where a front side of the cab is heightened by inserting the upside spacer between the connecting tool of the intermediate connecting member and the vibration isolating member, as viewed from a position similar to that in FIG. 4.

As shown in FIG. 7 and FIG. 10, the upside spacer 25 of the intermediate connecting member 20 is disposed between an upper surface of the flange mounting part 21B of the connecting tool 21 and a lower surface of the flange part 18B of the vibration isolating member 18 at the time of heightening the height position of the cab 14. The upside spacer 25 is formed as a diamond shaped plate body that is the same as the flange part 18B of the vibration isolating member 18 and the flange mounting part 21B of the connecting tool 21. In addition, the upside spacer 25 is composed of two members divided along a long diagonal line, that is, two split plates 25A. A semicircular large notch part 25A1 in which the main body part 18A of the vibration isolating member 18 is fitted and small notch parts 25A2 in which the vibration isolating bolts 24 are fitted in positions across the large notch part 25A1 are formed in each of the split plate 25A.

Figure 9:
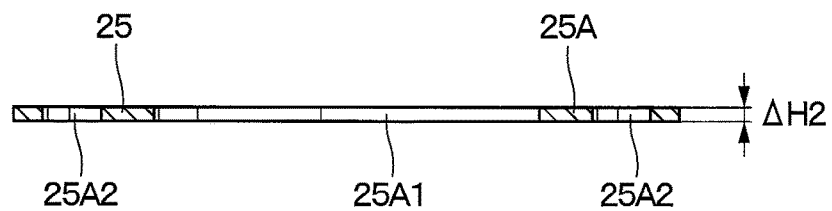
FIG. 9 is a cross section showing the upside spacer as a single body.

Here, the upside spacer 25 (two split plates 25A) is set to a plate thickness dimension $\Delta H2$ (see FIG. 9 and FIG. 10). The cab 14 is higher in a height position by the plate thickness dimension $\Delta H2$ of the upside spacer 25. In general, a plurality of kinds of upside spacers 25 that differ in a plate thickness dimension $\Delta H2$ are prepared, which will be optionally selected in response to a required height dimension for use. It should be noted that in FIG. 9 and FIG. 10 in which the upside spacer 25 is described, although a split surface of each of the split plates 25A is seen, a shape of the upside spacer 25 is clearly shown by describing hatching on the split surface.

Next, descriptions will be made of an example of the work procedure in a case of heightening a height position of the front side of the cab 14 using the intermediate connecting members 20 with reference to FIG. 4, FIG. 8 to FIG. 10 and the like.

Figure 8:
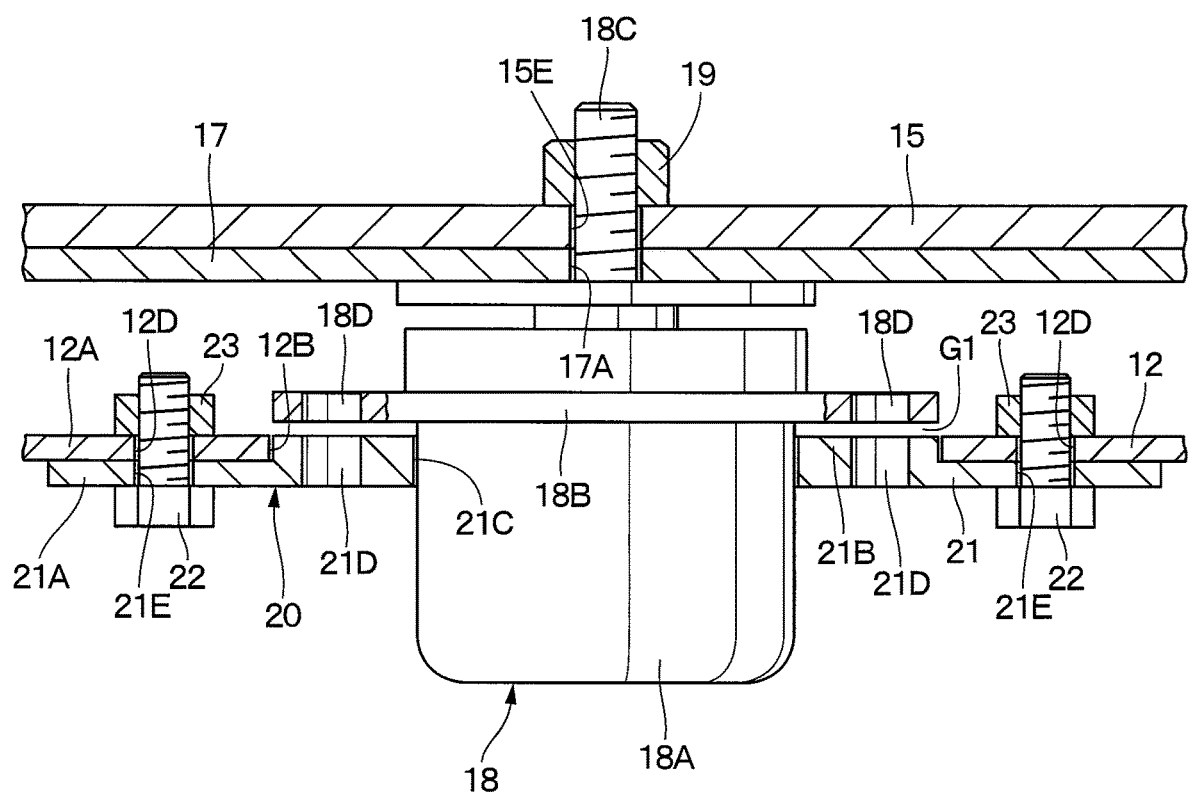
FIG. 8 is a cross section showing a state where vibration isolating side bolts fixing the vibration isolating member to the connecting tool of the intermediate connecting member are removed, as viewed from a position similar to that in FIG. 4.

First, in a standard specification shown in FIG. 4, the height position of the front side of the cab 14 is a height dimension H1 from the upper surface of the flat plate part 12A of the front side cab support frame 12 to the lower surface of the floor plate 17. In a case of heightening the height position of the front side of the cab 14 from this state, as shown in FIG. 8 about the vibration isolating member 18 positioned in the left front side of the cab 14, the two vibration isolating bolts 24 are loosened to be removed from each of the bolt through holes 18D of the vibration isolating member 18 and each of the bolt through holes 21E of the connecting tool 21. It should be noted that the vibration isolating bolts 24 may be only loosened to a position in which a gap for insert of the upside spacer 25 between the flange part 18B of the vibration isolating member 18 and the flange mounting part 21B of the connecting tool 21 is secured, without being removed.

When the two vibration isolating bolts 24 are removed, since the cab 14 supported by the other three vibration isolating members 18 moves to the upper side, a gap G1 is formed between the flange part 18B of the vibration isolating member 18 and the flange mounting part 21B of the connecting tool 21 (see FIG. 8). Therefore, each of the split plates 25A forming the upside spacer 25 is inserted in the gap G1 to sandwich the main body part 18A of the vibration isolating member 18. As shown in FIG. 10, when the upside spacer 25 is inserted in the gap G1, the vibration isolating bolts 24 are inserted in each of the bolt through holes 21D of the connecting tool 21 and each of the bolt through holes 18D of the vibration isolating member 18 and the nut 23 is screwed in the tip end of the vibration isolating bolt 24.

Thereby, the left front side section of the cab 14 can be made to a height dimension H2 higher by a plate thickness dimension $\Delta H2$ of the upside spacer 25 to the height position of the front side of the cab 14 in a standard specification, that is, as indicated at the following Formula 2, the height dimension H1 from the flat plate part 12A of the front side cab support frame 12 to the floor plate 17.

$$H2=H1+\Delta H2 \qquad \text{[Formula 2]}$$

On the other hand, the right front side of the cab 14 can be also heightened by performing the height adjustment work as described before about the vibration isolating member 18 and the intermediate connecting member 20 positioned in the right front side of the cab 14 as well.

The hydraulic excavator 1 according to the first embodiment has the configuration as described above, and hereinafter, an operation thereof will be explained.

First, an operator gets in the cab 14 to be seated on the operator's seat and controls the traveling lever/pedal to cause the hydraulic excavator 1 to travel to a working site. After causing the hydraulic excavator 1 to travel to the working site, an operator controls the working lever to lift and tilt the front device 4, making it possible to perform the excavating work of earth and sand.

In addition, the hydraulic excavator 1 generates vibrations at traveling or excavating. In this case, the four vibration isolating members 18 supporting the cab 14 can damp vibrations by displacing the mounting screw parts 18C to the main body parts 18A in the upper-lower direction. Thereby, it is possible to improve the ride comport of an operator who controls the hydraulic excavator 1 within the cab 14.

In this way, according to the first embodiment, the intermediate connecting member 20 is disposed between the front side cab support frame 12 forming the revolving frame 7 and each of the vibration isolating members 18 mounted on the cab 14 to adjust the height position of the cab 14 to the revolving frame 7. Further, the intermediate connecting member 20 is fixed to the front side cab support frame 12 of the revolving frame 7 from a lower side. Accordingly, in a case where the cab 14 is inclined or the gap between the lower end edge of the cab 14 and the revolving frame 7 is not made constant, it is possible to perform the height adjustment of the cab 14 only by fixing the intermediate connecting member 20 to the revolving frame 7 from the lower side. As a result, as described in the conventional art, it is not necessary to hoist the cab 14 using the crane or the like, thus making it possible to easily perform the height adjustment work of the cab 14.

Particularly, the intermediate connecting member 20 is formed of the connecting tool 21 supporting the vibration isolating member 18 to the revolving frame 7, and the upside spacer 25 that is disposed between the revolving frame 7 and the connecting tool 21 and adjusts the height position of the cab 14 to the revolving frame 7. Here, in a case of inserting the upside spacer 25 for the height adjustment, the two vibration isolating bolts 24 fixing the flange part 18B of the vibration isolating member 18 to the flange mounting part 21B of the connecting tool 21 are loosened to form the gap G1 between the upper surface of the flange mounting part 21B of the connecting tool 21 and the lower surface of the flange part 18B of the vibration isolating member 18. Besides, the upside spacer 25 is inserted in the gap G1 to fix the flange part 18B of the vibration isolating member 18 to the flange mounting part 21B of the connecting tool 21 by each of the vibration isolating bolts 24 once more. Thereby, the height position of the cab 14 can be heightened by the plate thickness dimension $\Delta H2$ of the upside spacer 25. In this case, the plurality of the kinds of the upside spacers 25 differing in a plate thickness dimension $\Delta H2$ are prepared and are optionally selected, making it possible to easily adjust the height position of the cab 14 in an optimal position.

In addition, the upside spacer 25 is split to the two split plates 25A across the main body part 18A of the vibration isolating member 18. Accordingly, the upside spacer 25 can be inserted in the gap G1 between flange mounting part 21B of the connecting tool 21 and the flange part 18B of the vibration isolating member 18 without removing the vibration isolating member 18 and each of the vibration isolating bolts 24. Thereby, the height adjustment work can be performed more easily.

Figure 11:
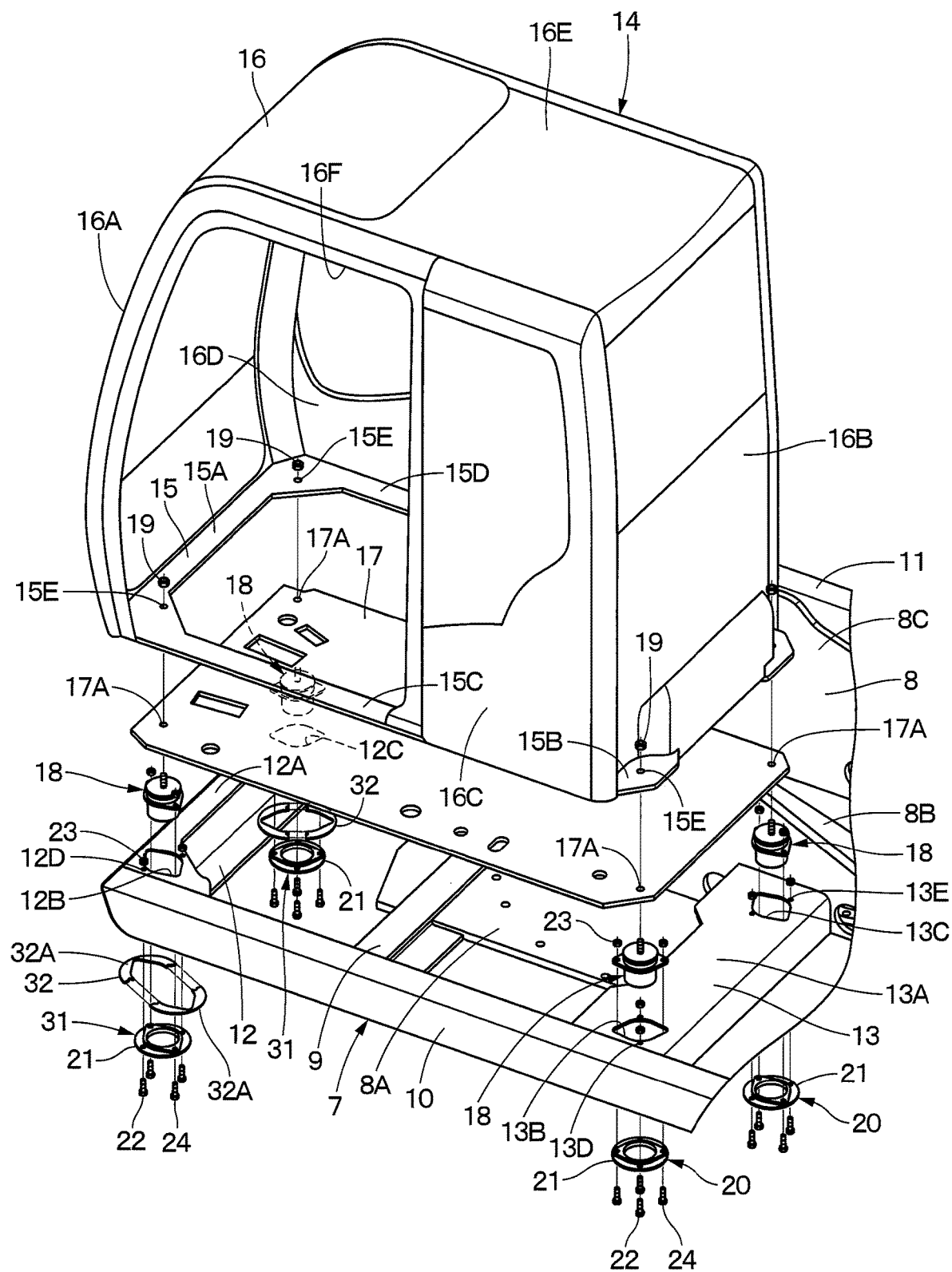
Figure 15:
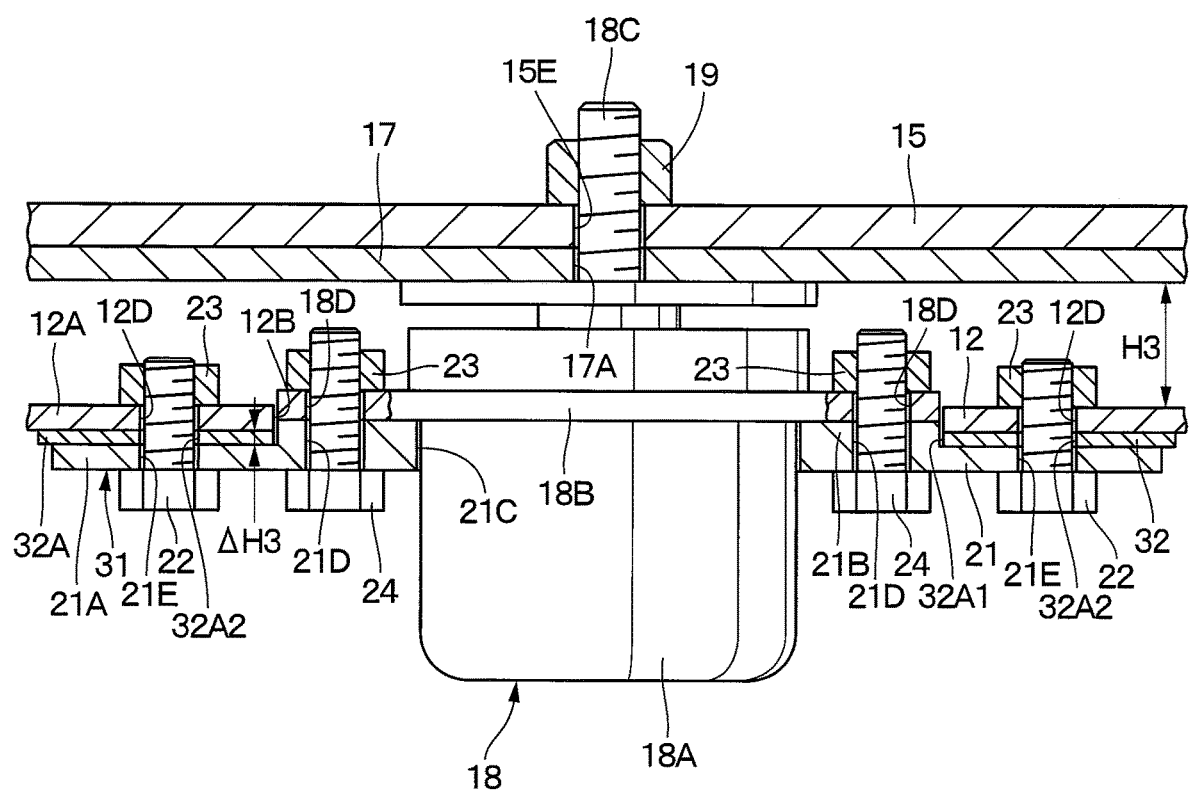
FIG. 15 is a cross section showing a state where a front side of the cab is lowered by inserting the downside spacer between the flat plate part of the front side cab support frame and the connecting tool of the intermediate connecting member, as viewed from a position similar to that in FIG. 4.

Next, FIG. 11 and FIG. 15 show a second embodiment of the present invention. The second embodiment exemplifies a case of performing adjustment of lowering a left front side and a left rear side of a cab.

A vibration isolating member according to the present embodiment includes a main body part having a damping function of vibrations, a flange part disposed on an outer periphery of the main body part and a fastening part that projects toward an upper side from the main body part and is mounted on a bottom plate of a cab. An intermediate connecting member has a connecting tool that supports the vibration isolating member to a vehicle body frame, and a spacer that adjusts a height position of the cab to the vehicle body frame. The spacer is a downside spacer that is arranged between a lower surface of the vehicle body frame and an upper surface of the connecting tool of the intermediate connecting member to lower the height position of the cab. It should be noted that in the second embodiment, components identical to those in the first embodiment are referred to as identical reference numerals to omit an explanation thereof.

In FIG. 11, intermediate connecting members 31 used in the second embodiment have a height adjustment function of the cab 14 and are disposed respectively between the flat plate part 12A of the front side cab support frame 12 and the left and right vibration isolating members 18 position in the front side. Each of the intermediate connecting members 31 overlaps a downside spacer 32 between the upper surface of the disc part 21A of the connecting tool 21 and the lower surface of the flat plate part 12A of the front side cab support frame 12 in the upper-lower direction using the connecting tool 21 in the first embodiment as a base, making it possible to lower the height position of the front side of the cab 14.

Figure 12:
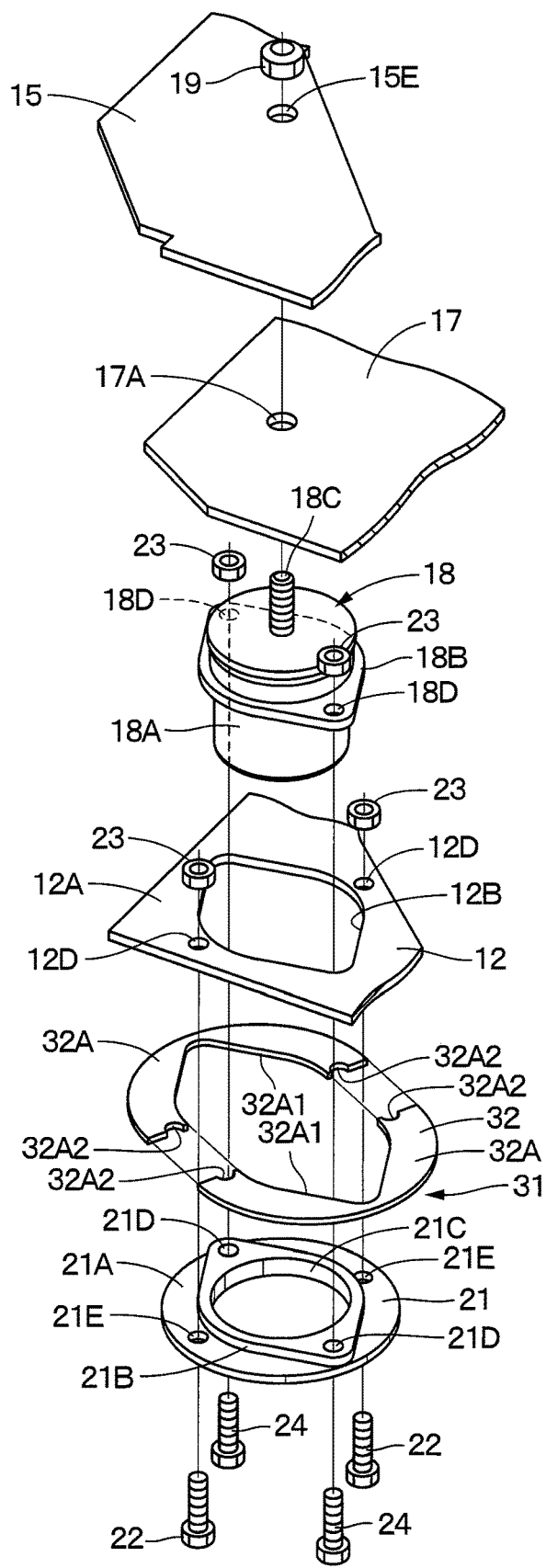
FIG. 12 is an exploded perspective view showing the intermediate connecting member according to the second embodiment together with the flat plate part of the front side cab support frame, the cab (the base frame and the floor plate) and the vibration isolating member.

As shown in FIG. 12 and FIG. 15, the downside spacer 32 according to the second embodiment is disposed between the upper surface of the disc part 21A of the connecting tool 21 and the lower surface of the flat plate part 12A of the front side cab support frame 12 at the time of lowering the height position of the front side of the cab 14. The downside spacer 32 is formed as an annular plate body having a diameter dimension larger than a diameter dimension of the connecting tool 21. The downside spacer 32 is composed of two members split along a radial line passing a center of each of the bolt through holes 21E of the connecting tool 21, that is, two split plates 32A. A semicircular large notch part 32A1 in which the flange mounting part 21B of the connecting tool 21 is fitted and small notch parts 32A2 in which the frame bolts 22 are fitted in positions across the large notch part 32A1 are formed in each of the split plates 32A.

Figure 14:
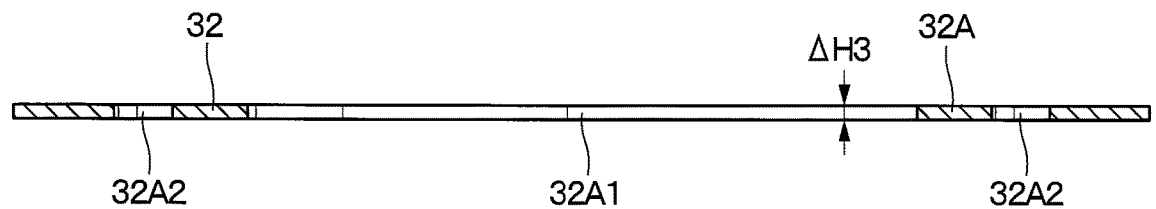
FIG. 14 is a cross section showing the downside spacer as a single body.

Here, the downside spacer 32 (two split plates 32A) is set to a plate thickness dimension $\Delta H3$ (see FIG. 14 and FIG. 15). The cab 14 is lower in a height position by the plate thickness dimension $\Delta H3$ of the downside spacer 32. In general, a plurality of kinds of downside spacers 32 that differ in a plate thickness dimension $\Delta H3$ are prepared, which will be optionally selected in response to a required height dimension for use. It should be noted that in FIG. 14 and FIG. 15 in which the downside spacer 32 is described, although a split surface of each of the split plates 32A is seen, a shape of the downside spacer 32 is clearly shown by describing hatching on the split surface.

Figure 13:
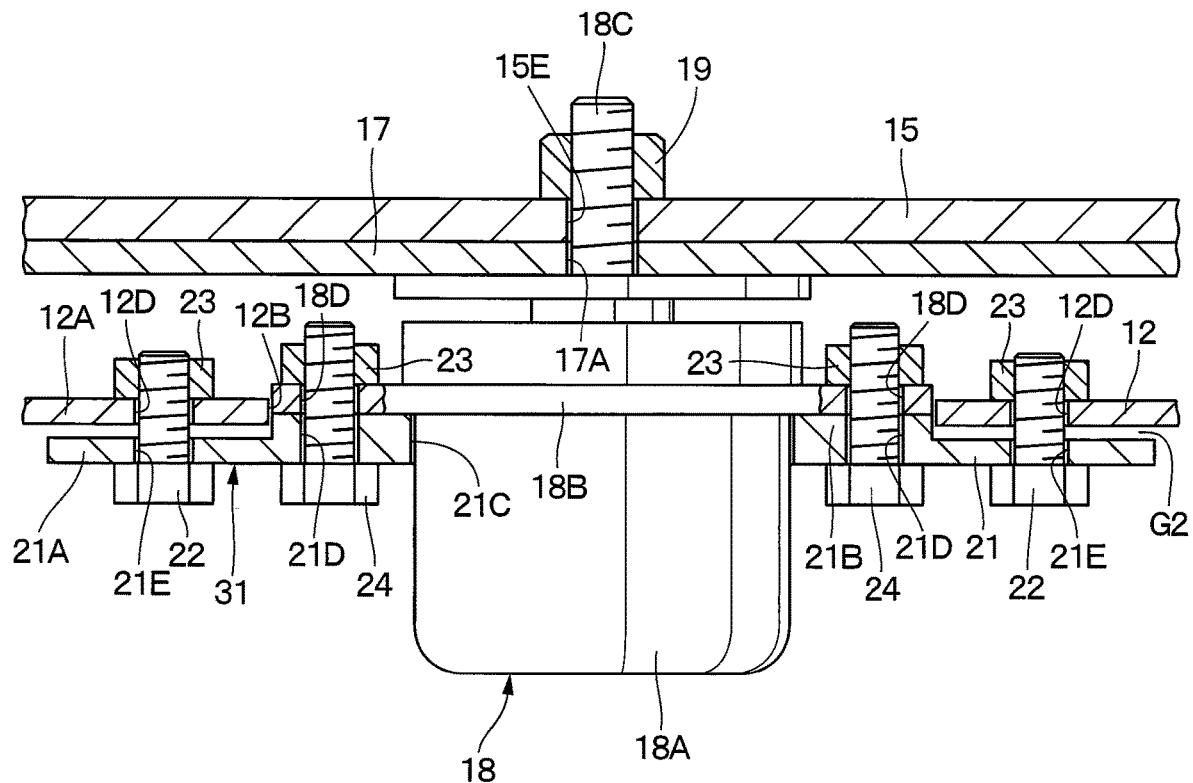
FIG. 13 is a cross section showing a state where frame side bolts fixing the connecting tool of the intermediate connecting member to the flat plate part of the front side cab support frame are loosened, as viewed from a position similar to that in FIG. 4.

Next, descriptions will be made of an example of the procedure in a case of lowering a height position of the front side of the cab 14 using the intermediate connecting members 31 with reference to FIG. 13 to FIG. 15 and the like. FIG. 13 to FIG. 15 schematically show the frame bolts 22 and the vibration isolating bolts 24 assuming that the frame bolts 22 and the vibration isolating bolts 24 exist on the same cross section in the same way as FIG. 4, FIG. 5, and FIG. 8 to FIG. 10 used in the first embodiment for easy understanding of a mounting relation of the intermediate connecting member 31 that is a characterized portion of the present invention.

In a case of lowering the height position of the front side of the cab 14, as shown in FIG. 13, a total of the four frame bolts 22 positioned in the left front side and the right front side of the cab 14 are loosened. When the four frame bolts 22 are loosened, the left and right connecting tools 21 move to the lower side together with the front side section of the cab 14 and each of the vibration isolating members 18. Thereby, a gap G2 is formed between the upper surface of the disc part 21A of the connecting tool 21 and the lower surface of the flat plate part 12A of the front side cab support frame 12. Therefore, each of the split plates 32A forming the downside spacer 32 is inserted in the gap G2 to sandwich the flange mounting part 21B of the connecting tool 21. As shown in FIG. 15, when the downside spacer 32 is inserted in the gap G2, the frame bolts 22 are fastened.

Thereby, the front side section of the cab 14 can be made to a height dimension H3 lower by a plate thickness dimension $\Delta H3$ of the downside spacer 32 to the height position of the front side of the cab 14 in the standard specification, that is, as indicated at the following Formula 3, the height dimension H1 from the flat plate part 12A of the front side cab support frame 12 to the floor plate 17.

$$H3=H1-\Delta H3 \qquad \text{[Formula 3]}$$

In this way, the intermediate connecting member 31 according to the second embodiment has the configuration as described above, and is provided with the downside spacer 32 lowering the height position of the front side of the cab 14 by being arranged between the upper surface of the disc part 21A of the connecting tool 21 and the lower surface of the flat plate part 12A of the front side cab support frame 12. Thereby, it is not necessary to hoist the cab 14 using a crane or the like, making it possible to easily lower the height position of the front side of the cab 14.

Next, FIG. 16 to FIG. 19 show a third embodiment of the present invention. The present embodiment is characterized in that a vibration isolating member includes a main body part having a damping function of vibrations, a flange part disposed on an outer periphery of the main body part and a fastening part that projects toward an upper side from the main body part and is mounted on a bottom plate of a cab. An intermediate connecting member is formed of a connecting tool that is formed in a disc shape to surround the main body part of the vibration isolating member and supports the vibration isolating member to a lower surface of a vehicle body frame, and a height adjustment part that is disposed to project upward in an inner diameter side of the connecting tool to face the flange part of the vibration isolating member, has a height dimension different from a plate thickness dimension of the vehicle body frame and in which a lower surface of the flange part is mounted. It should be noted that in the third embodiment, components identical to those in the first embodiment are referred to as identical reference numerals to omit an explanation thereof.

Figure 16:
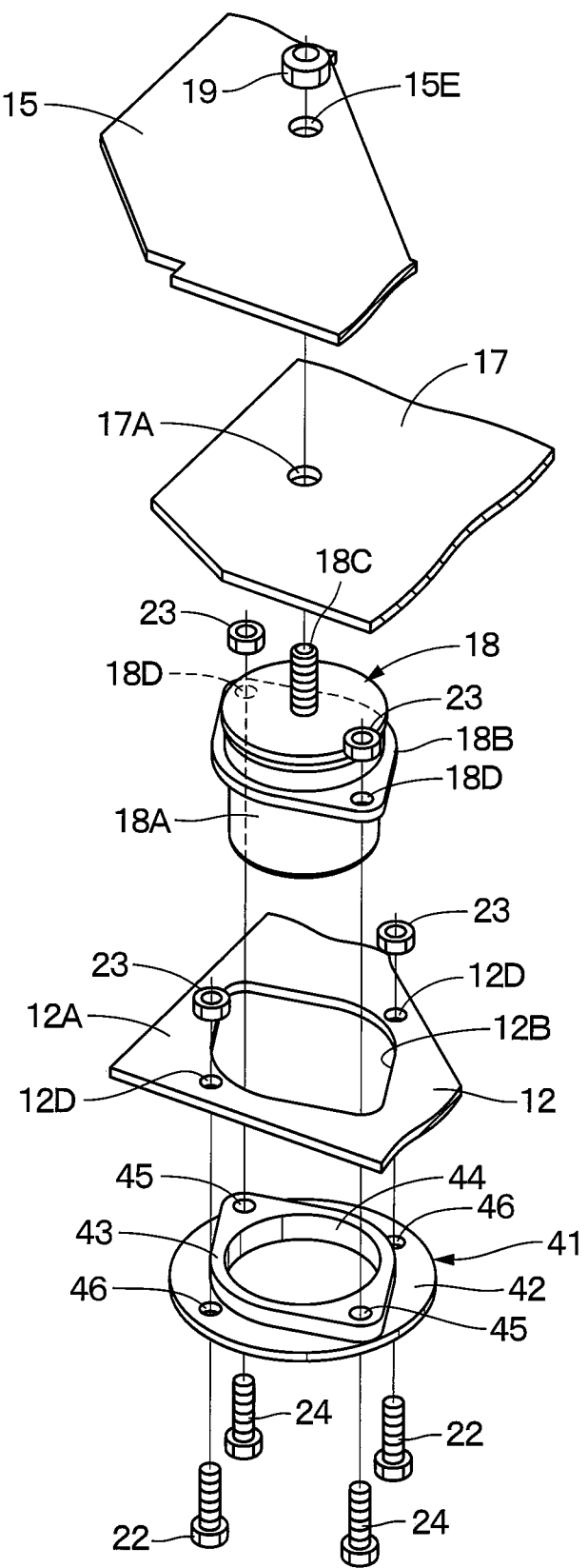
FIG. 16 is an exploded perspective view showing an intermediate connecting member according to a third embodiment together with the flat plate part of the front side cab support frame, the cab (the base frame and the floor plate) and the vibration isolating member.
Figure 18:
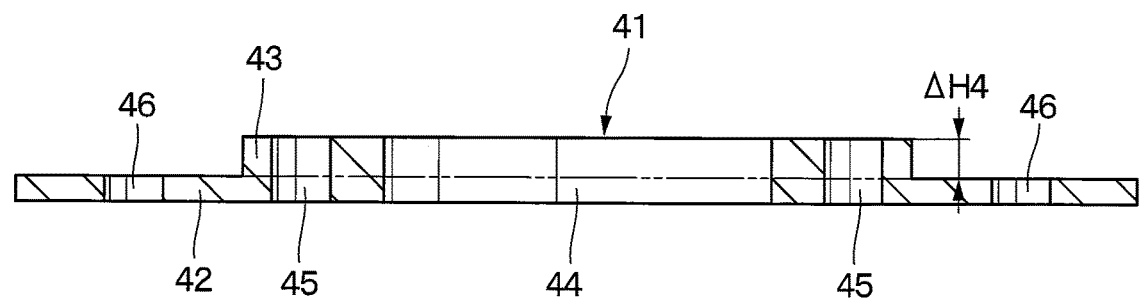
FIG. 18 is a cross section showing the intermediate connecting member provided with a height adjustment part of the cab as a single body.

In FIG. 16, intermediate connecting members 41 used in the third embodiment have a height adjustment function of the cab 14 and are disposed respectively between the flat plate part 12A of the front side cab support frame 12 and the left and right vibration isolating members 18 positioned in the front side. As shown in FIG. 18, each of the intermediate connecting members 41 includes a connecting tool 42 composed of an annular plate body and a height adjustment part 43 that is disposed to project upward in an inner diameter side of the connecting tool 42 and in which a lower surface of the flange part 18B is mounted. The intermediate connecting member 41 according to the third embodiment can adjust the height position of the front side of the cab 14 by the height adjustment part 43.

The height adjustment part 43 forming the intermediate connecting member 41 is disposed to project upward in the inner diameter side of the connecting tool 42 to face the flange part 18B of the vibration isolating member 18. The height adjustment part 43 is formed in a diamond shape that is the same as or close to that of the flange part 18B of the vibration isolating member 18. Here, a height dimension ΔH4 of the height adjustment part 43 is, as indicated at the following Formula 4, set to a dimension different from the plate thickness dimension ΔH1 of the flat plate part 12A of the front side cab support frame 12. Thereby, the intermediate connecting member 41 according to the third embodiment is used instead of the intermediate connecting member 20 of the standard specification, making it possible to adjust the height position of the cab 14.

$$\Delta H4 \neq \Delta H1 \quad \text{[Formula 4]}$$

Figure 19:
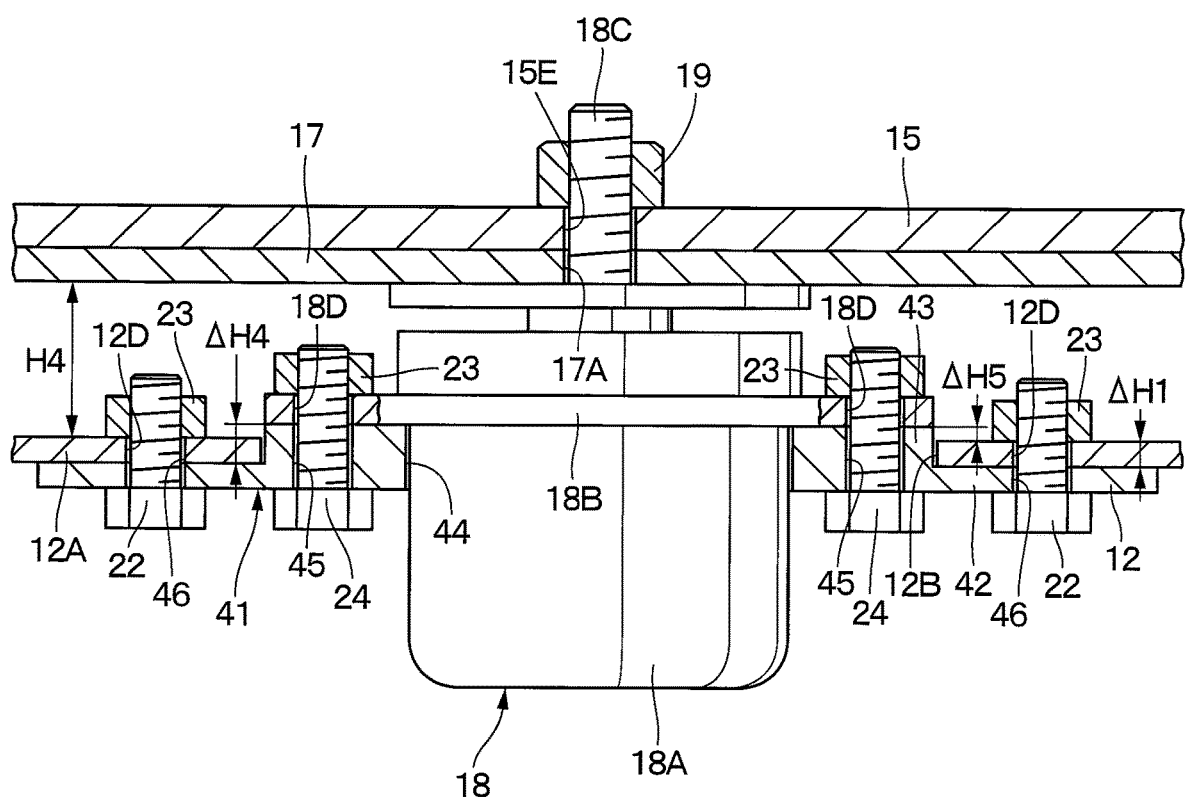
FIG. 19 is a cross section showing a state where a front side of the cab is heightened by mounting the intermediate connecting member on the flat plate part of the front side cab support frame and the vibration isolating member, as viewed from a position similar to that in FIG. 4.

As shown in FIG. 19, the third embodiment exemplifies a case of heightening the height position of the front side of the cab 14 to the height dimension H4 by the intermediate connecting member 41. Therefore, the height dimension ΔH4 of the height adjustment part 43 is, as indicated at the following Formula 5, set to a value larger by an adjustment dimension ΔH5 than the plate thickness dimension ΔH1 of the flat plate part 12A.

$$\Delta H4 = \Delta H1 + \Delta H5 \quad \text{[Formula 5]}$$

An inner diameter side of the intermediate connecting member 41 becomes a circular opening 44 for insert of the main body part 18A of the vibration isolating member 18. Two bolt through holes 45 corresponding to the respective bolt through holes 18D of the vibration isolating member 18 are disposed to penetrate in the upper-lower direction in the intermediate connecting member 41 to be positioned on an outer peripheral side on a long diagonal line in the diamond shaped height adjustment part 43. Further, two bolt through holes 46 are disposed to penetrate the intermediate connecting member 41 in the upper-lower direction in positions rotated by 90 degrees from each of the bolt through holes 45. Each of the bolt through holes 46 corresponds to each of the bolt through holes 12D of the front side cab support frame 12 and each of the bolt through holes 13D, 13E of the cab support extension beam 13.

Figure 17:
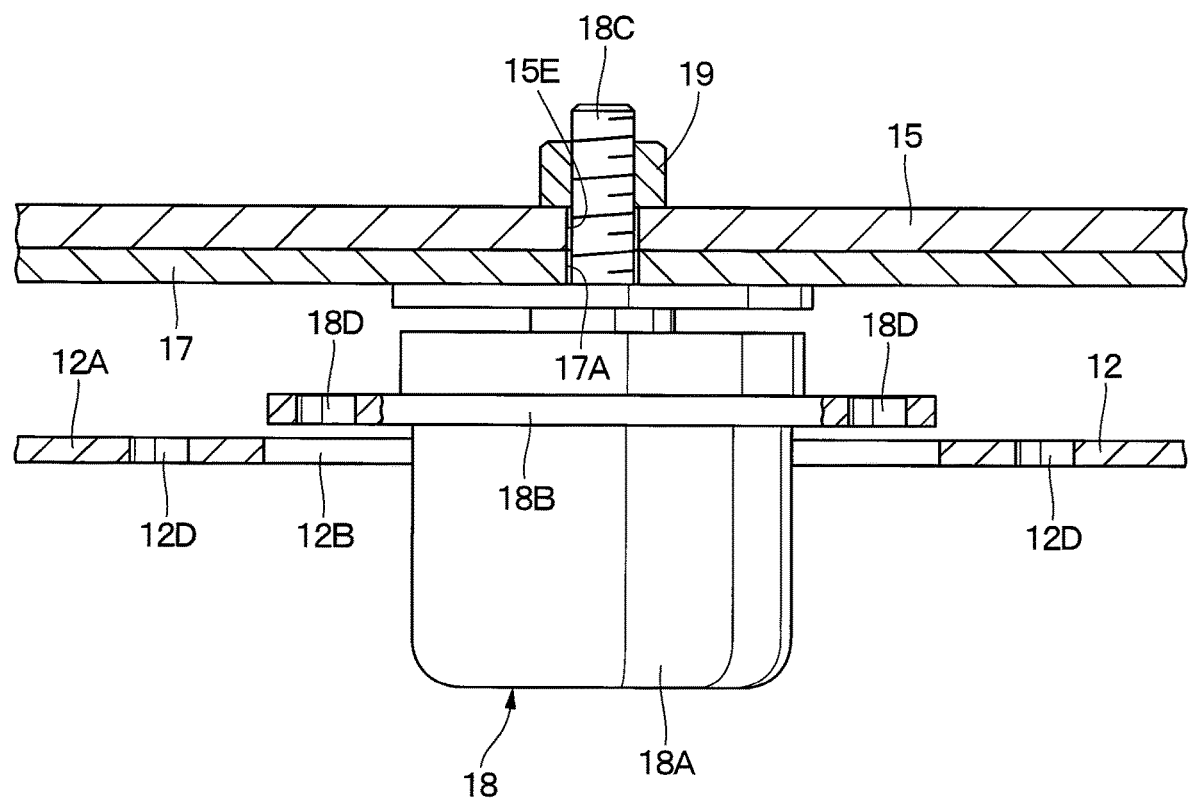
FIG. 17 is a cross section showing a state where an intermediate connecting member of a standard specification is removed from the flat plate part of the front side cab support frame and the vibration isolating member, as viewed from a position similar to that in FIG. 4.

In a case of heightening the height position of the front side section of the cab 14 to the height dimension H4 using the intermediate connecting member 41, as shown in FIG. 17 the intermediate connecting member 20 of the standard specification is removed. Besides, as shown in FIG. 19 the intermediate connecting member 41 having the height adjustment function is mounted instead of the intermediate connecting member 20.

That is, the height adjustment part 43 of the intermediate connecting member 41 is fitted in the left vibration isolating member mounting hole 12B disposed in the flat plate part 12A of the front side cab support frame 12 from a lower side. In this state, the frame bolts 22 are inserted in each of the bolt through holes 46 and each of the bolt through holes 12D of the flat plate part 12A from the lower side and the nut 23 is screwed in the tip end of the frame bolt 22. Thereby, the intermediate connecting member 41 can be mounted on a left side section of the front side cab support frame 12.

When the intermediate connecting member 41 is mounted on the left side section of the front side cab support frame 12, as shown in FIG. 19 the main body part 18A of the vibration isolating member 18 is inserted in the opening 44 from an upper side and the flange part 18B of the vibration isolating member 18 is placed on the height adjustment part 43 in a positioning state. In this state, the vibration isolating bolts 24 are inserted in each of the bolt through holes 45 and each of the bolt through holes 18D of the vibration isolating member 18 from a lower side and the nut 23 is screwed in the tip end of the vibration isolating bolt 24. Thereby, the vibration isolating member 18 can be mounted on the left side section of the front side cab support frame 12 through the intermediate connecting member 41. Likewise, the intermediate connecting member 41 and the vibration isolating member 18 are mounted on a right side section of the front side cab support frame 12 (right front section of the cab 14) as well. Thereby, the front side section of the cab 14 can be heightened by the adjustment dimension ΔH5.

In this way, the intermediate connecting member 41 according to the third embodiment has the configuration as described above. Accordingly, a plurality of kinds of the intermediate connecting members 41 differing in the height dimension ΔH4 of the height adjustment part 43 are prepared, and the intermediate connecting member 41 is selected to be mounted, thus making it possible to easily perform the height adjustment of the cab 14.

Figure 20:
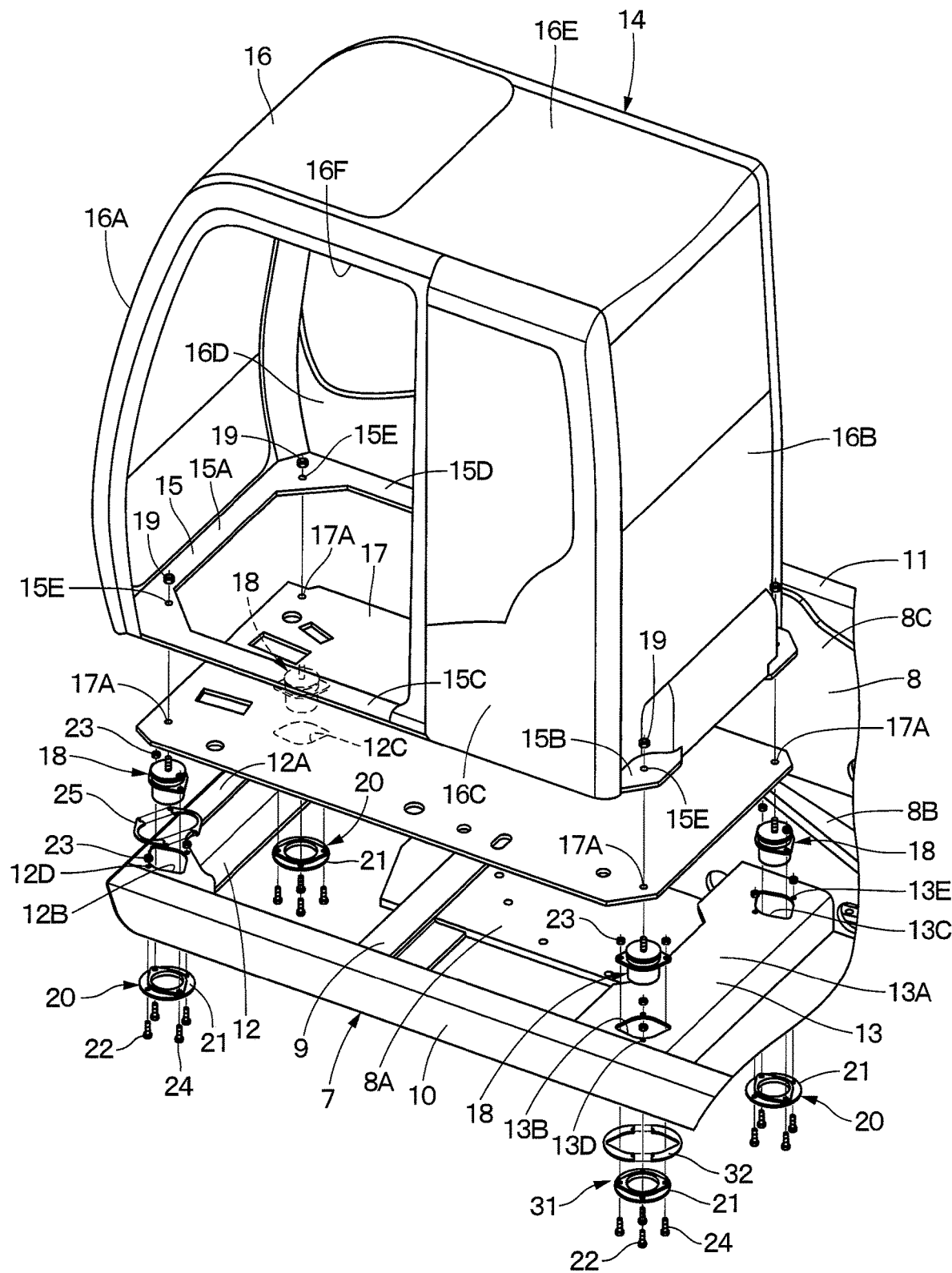

It should be noted that the first embodiment exemplifies a case of heightening the height dimension of the front side of the cab 14 using the intermediate connecting member 20 provided with the upside spacer 25. On the other hand, the second embodiment exemplifies a case of lowering the height dimension of the front side of the cab 14 using the intermediate connecting member 31 provided with the downside spacer 32. However, the present invention is not limited thereto, but, for example, may be configured as a modification shown in FIG. 20. That is, as the modification shown in FIG. 20, the intermediate connecting member 20 provided with the upside spacer 25 may be disposed in the left front side of the cab 14 and the intermediate connecting member 31 provided with the downside spacer 32 may be disposed in the left rear side of the cab 14. In this case, an adjustment amount in the height direction can be made large in the front side and the rear side of the cab 14. In addition, the intermediate connecting member 20 provided with the upside spacer 25 may be disposed in one side in the left and front directions of the cab 14 and the intermediate connecting member 31 provided with the downside spacer 32 may be disposed in the other side.

In the third embodiment as well, an inclination of the cab 14 may be adjusted by disposing the intermediate connecting members 41 differing in the height dimension ΔH4 of the height adjustment part 43 in the front and rear positions or in the left and right positions of the cab 14. Further, the intermediate connecting member 20 provided with the upside spacer 25, the intermediate connecting member 31 provided with the downside spacer 32 and the intermediate connecting member 41 provided with the height adjustment part 43 may be combined as needed.

In the third embodiment, the height dimension ΔH4 of the height adjustment part 43 in the intermediate connecting member 41 is set to a value larger by the adjustment dimension ΔH5 than the plate thickness dimension ΔH1 of the flat plate part 12A. Thereby, the third embodiment exemplifies a case of heightening the height position of the front side of the cab 14 by the intermediate connecting member 41. However, the present invention is not limited thereto, but the height dimension ΔH4 of the height adjustment part 43 in the intermediate connecting member 41 may be set to a value smaller than the plate thickness dimension ΔH1 of the flat plate part 12A. In this case, it is possible to adjust the height position of the front side of the cab 14 to be low by the intermediate connecting member 41.

The first embodiment exemplifies a case of splitting the upside spacer 25 in the two split plates 25A across the main body part 18A of the vibration isolating member 18 and the two vibration isolating bolts 24 (bolt through holes 18D). However, the present invention is not limited thereto, but, for example, the upside spacer 25 may be split to each of the vibration isolating bolts 24-side across the main body part 18A of the vibration isolating member 18. That is, the upside spacer 25 may be configured such that the straight line splitting the upside spacer 25 in each of the split plates 25A is made to a position rotated by 90 degrees and the upside spacer 25 is split along this rotated straight line. This arrangement can be likewise applied to the second embodiment.

In addition, the first embodiment exemplifies a case of arranging the four vibration isolating members 18 between the revolving frame 7 and the cab 14. However, the present invention is not limited thereto, but the cab 14 may be supported using five vibration isolating members or more. This arrangement can be likewise applied to other embodiments.

Further, each of the embodiments exemplifies the hydraulic excavator 1 having the lower traveling structure 2 of the crawler type. However, the present invention is not limited thereto, but can be widely applied to construction machines on which a cab is mounted through a vibration isolating member on a frame, such as a hydraulic excavator of a wheel type, a wheel loader or the like.

DESCRIPTION OF REFERENCE NUMERALS

7: Revolving frame (Vehicle body frame)
12: Front side cab support frame
13: Cab support extension beam
14: Cab
15: Base frame (Bottom plate)
17: Floor plate (Bottom plate)
18: Vibration isolating member
18A: Main body part
18B: Flange part
18C: Mounting screw part (Fastening part)
19: Nut (Fastening part)
20, 31, 41: Intermediate connecting member
21, 42: Connecting tool
21A: Disc part
21B: Flange mounting part
25: Upside spacer
25A, 32A: Split plate (Member)
32: Downside spacer
43: Height adjustment part
H1, H2, H3, H4: Height dimension between flat plate part of front side cab support frame and floor plate of cab
ΔH1: Plate thickness dimension of flat plate part of front side cab support frame
ΔH4: Height dimension of height adjustment part

The invention claimed is:

1. A construction machine comprising:
a vehicle body frame forming a support structure;
a cab that is disposed to be positioned on a front side and an upper side of said vehicle body frame and in the inside of which an operator's room is defined; and
a plurality of vibration isolating members that are disposed between said vehicle body frame and said cab to support said cab on said vehicle body frame in a vibration isolating state, wherein:
a plurality of intermediate connecting members that fix said vibration isolating member to said vehicle body frame are provided,
said intermediate connecting members are present and fixed on a lower surface of said vehicle body frame from a lower side,
said vibration isolating member includes:
a main body part having a damping function of vibrations;
a flange part that is disposed on an outer periphery of said main body part; and
a fastening part that projects upward from said main body part and is mounted on a bottom plate of said cab,
said intermediate connecting member includes:
a connecting tool that supports said vibration isolating member to the lower surface of said vehicle body frame; and
a spacer that adjusts a height position of said cab to said vehicle body frame,
said spacer of said intermediate connecting member is a downside spacer that is arranged between the lower surface of said vehicle body frame and an upper surface of said connecting tool to lower the height position of said cab.

2. The construction machine according to claim 1, wherein
said spacer is split into two members across said main body part of said vibration isolating member.

3. A construction machine comprising:
a vehicle body frame forming a support structure;
a cab that is disposed to be positioned on a front side and an upper side of said vehicle body frame and in the inside of which an operator's room is defined; and
a plurality of vibration isolating members that are disposed between said vehicle body frame and said cab to support said cab on said vehicle body frame in a vibration isolating state, wherein:
a plurality of intermediate connecting members that fix said vibration isolating member to said vehicle body frame are provided,
said intermediate connecting members are present and fixed on a lower surface of said vehicle body frame from a lower side,
said vibration isolating member includes:
a main body part having a damping function of vibrations;
a flange part that is disposed on an outer periphery of said main body part; and
a fastening part that projects upward from said main body part and is mounted on a bottom plate of said cab, said intermediate connecting member includes:
a connecting tool that supports said vibration isolating member to the lower surface of said vehicle body frame; and
a spacer that adjusts a height position of said cab to said vehicle body frame,
said connecting tool of said intermediate connecting member includes:
a disc part that is composed of an annular plate body and is mounted on the lower surface of said vehicle body frame; and
a flange mounting part that is formed to project upward to an inner diameter side of said disc part and in which a lower surface of the flange part of said vibration isolating member is mounted.

4. The construction machine according to claim 3, wherein
said spacer of said intermediate connecting member is an upside spacer that is arranged between an upper surface of said flange mounting part of said connecting tool and the lower surface of said flange part of said vibration isolating member to heighten the height position of said cab.

5. The construction machine according to claim 3, wherein
said spacer of said intermediate connecting member is a downside spacer that is arranged between the lower surface of said vehicle body frame and an upper surface of said disc part of said connecting tool to lower the height position of said cab.

6. A construction machine comprising:
a vehicle body frame forming a support structure;
a cab that is disposed to be positioned on a front side and an upper side of said vehicle body frame and in the inside of which an operator's room is defined; and
a plurality of vibration isolating members that are disposed between said vehicle body frame and said cab to support said cab on said vehicle body frame in a vibration isolating state, wherein:
a plurality of intermediate connecting members that fix said vibration isolating member to said vehicle body frame are provided,
said intermediate connecting members are present and fixed on a lower surface of said vehicle body frame from a lower side,
said vibration isolating member includes:
a main body part having a damping function of vibrations;
a flange part that is disposed on an outer periphery of said main body part; and
a fastening part that projects upward from said main body part and is mounted on a bottom plate of said cab, and
said intermediate connecting member includes:
a connecting tool that is formed in a disc shape surrounding said main body part of said vibration isolating member and supports said vibration isolating member to the lower surface of said vehicle body frame; and
a height adjustment part that is disposed to project upward in an inner diameter side of said connecting tool to face said flange part of said vibration isolating member, has a height dimension differing in a plate thickness dimension of said vehicle body frame and in which a lower surface of said flange part is mounted.

* * * * *